(12) United States Patent
Danieli

(10) Patent No.: US 6,510,513 B1
(45) Date of Patent: Jan. 21, 2003

(54) SECURITY SERVICES AND POLICY ENFORCEMENT FOR ELECTRONIC DATA

(75) Inventor: Damon V. Danieli, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/229,427

(22) Filed: Jan. 13, 1999

(51) Int. Cl.[7] .............................. H04L 9/32; G06F 12/14
(52) U.S. Cl. ...................... 713/156; 713/155; 713/160; 713/165; 713/178; 713/193; 705/51; 705/53; 380/279
(58) Field of Search ................................. 713/155, 156, 713/160, 164, 165, 166, 167, 175, 176, 178, 179, 181, 193, 201; 705/1, 51, 52, 53; 380/279

(56) References Cited

U.S. PATENT DOCUMENTS 5,638,446 A * 6/1997 Rubin .......................... 380/25
6,263,313 B1 * 7/2001 Milsted et al. .................. 705/1

FOREIGN PATENT DOCUMENTS

| EP | 0737907 | 10/1996 | ............ G06F/1/00 |
| EP | 0809221 | 11/1997 | ............ G07F/17/16 |
| WO | 97/50036 | 12/1997 | ............ G06F/12/14 |
| WO | 98/42098 | 9/1998 | ............. H04L/9/00 |

OTHER PUBLICATIONS

"VeriSign Digital ID Center," http://digitalid.verisign.com/id_intro.htm, Jun. 19, 1998, pp. 1–7.

* cited by examiner

Primary Examiner—Justin T. Darrow
(74) Attorney, Agent, or Firm—Lee & Hayes, PLLC

(57) ABSTRACT

Security services and policy enforcement for electronic data is provided through a series of transactions among a server and clients using electronic security certificates. A first client generates a digest from the electronic data, and submits a security certificate request containing the digest to a trusted arbitrator server, where the request is time stamped and logged. The trusted arbitrator authenticates the first client's credentials and returns the security certificate to the first client. The data and security certificate are combined to create a distribution unit. A second client acquires the distribution unit, extracts the security certificate, and generates a digest from the data. If the digest from the second client matches the logged digest from the first client, the data is valid. Depending on the certificate type and policy level, the trusted arbitrator server provides other services to the clients, such as notification of improper user of the data.

29 Claims, 23 Drawing Sheets

TRUSTED ARBITRATOR PROCESSES

SECURITY SERVICES AND POLICY ENFORCEMENT FOR ELECTRONIC DATA

FIELD OF THE INVENTION

This invention relates generally to authenticating and validating electronic data, and more particularly to providing security for, and enforcing restrictions on the use of, electronic data.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 1997, Microsoft Corporation, All Rights Reserved.

BACKGROUND OF THE INVENTION

Electronic data is inherently intangible and not easily identifiable as to its origin, date of creation, or what restrictions may apply to it. Computer users frequently download software applications from the Internet but in many cases the user cannot tell if the application is authored by the owner of the download site or by someone else. Information, such as news articles, short stories, jokes and cartoons, is also available for download but the user often cannot tell if the information has been posted with the permission of the author, or if the information can be reused or modified without interfering with someone's intellectual property rights.

While the source of electronic data distributed on "hard" media such as CD-ROM or floppy disk can be identified by labeling the media, the data itself can be changed after the media left the author. Furthermore, although hard media is usually distributed under license, the enforcement of the licensing terms is difficult.

A "public key/private key" approach has been employed to address the problems of authentication and validation of electronic data. In a public key/private key scheme, the author encrypts the data with a private key. The encrypted data can only be decrypted using the author's public key. If the recipient uses the public key and the use of the public key properly decrypts the encrypted data, the recipient can be certain the data originated with the author. For extra security, the data can be encrypted several times, using layers of public and private keys of both the author and recipient. The process quickly becomes complicated and prone to error.

Similar encryption schemes have been used to require a user to register or pay a fee for the use of the electronic data. The data is encrypted and the author only provides the decrypting key upon registration or payment. Such limited licensing enforcement has not been successful, however, because, among other reasons, many users want to review the data before registering and find the decryption process confusing.

Electronic certificate authorities, such as Verisign, Inc., provide for some authentication of electronic data by supplying individuals and companies with certificates which uniquely identify the individual or company. The author includes the certificate with the electronic data to identify the source of the data. Electronic certificates are also frequently combined with encryption of the data to provide a minimal level of security for the data. However, nothing in the certificate prevents someone from redistributing the data as their own work, or from modifying the data.

One approach to memorializing the creation of electronic data uses an encryption routine, often referred to as a "one-way hash," to reduce the electronic data to a unique number-letter combination, or hash value, from which the data itself cannot be reproduced. The hash is then sent to a trusted third-party which gives each hash value a sequence number based on the order in which it is received. If a second person hashes the same data with the same hash algorithm (producing the same hash value) and sends the hash value to the same third-party service, the sequence number of the second hash value is greater than that of the first. The trusted party publishes the hash values and the sequence numbers. A receiver of the electronic data generates the hash value and matches it against the published list to determine of more than one sequence number has been assigned. The receiver of the data is responsible for determining if the data it received originated with the author because the third-party service does not authenticate the senders.

Thus, an author must make sure to register the hash before the electronic data is released publicly. Furthermore, if the second person sends the second hash value to a different third-party service, the sequence numbers cannot be compared as they do not indicate the time and/or date of the submission.

Therefore, what is needed is a mechanism to guarantee the authenticity and validity of electronic data, to enforce use restrictions on the data, to memorialize the creation of the data, and to do so without requiring the author or the recipient to understand complicated encryption schemes.

SUMMARY OF THE INVENTION

The above-mentioned shortcomings, disadvantages and problems are addressed by the present invention, which will be understood by reading and studying the following specification.

Security services and policy enforcement for electronic data is provided through a series of transactions among a server and clients using electronic certificates which are associated with the electronic data. A first client, an author or originator of electronic data, generates a digest of the data using a one-way hashing algorithm, creates a request for a security certificate specifying type of security and policy level, and sends the security certificate request and digest to the server of a trusted arbitrator. The server authenticates the first client, registers, timestamps and logs the certificate and digest, and returns an electronically signed confirmation receipt to the first client. The confirmation receipt contains the digest and the first client can optionally insert the receipt into the security certificate. The first client combines the security certificate with the data, and distributes the combination as a distribution unit.

A second client, a user, acquires the distribution unit, extracts the data from the distribution unit, and generates a digest from the data using the same hashing algorithm. When the security certificate contains the digest generated by the first client, the second client compares the digests. If the digests match, the distribution unit acquired by the user is valid. If the digests do not match, the file cannot be validated.

If the security certificate does not contain a signed confirmation receipt or the user cannot validate the signature, the user submits the digest to the server. The server compares the digest generated by the user with the logged digest. If the digests match, the distribution unit acquired by the user is valid and the server returns a valid message. If the digests do not match, the server returns an invalid message.

Depending on the certificate type and policy level, the server provides other services to the clients, such as notification of updates to the data, notification of improper user of the data, and payment for the use of the data.

The supporting functions for the clients are automatically provided by modules, or components, in standard software so the author and the user do not have to concern themselves with complicated encryption/decryption schemes. The server functions are additional components to server software that already provides electronic certificates.

Thus, the present invention guarantees the authenticity and validity of the electronic data and enforces use restrictions on the data through the use of the certificates. Furthermore, because the server has authenticated the first client prior to creating the certificate, and time stamps the digest that is generated from the electronic data along with the security certificate, the verification log serves to memorialize the first client and creation time of the data.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into five sections. In the first section, the hardware and the operating environment in conjunction with which embodiments of the invention may be practiced are described. In the second section, a system level overview of an exemplary embodiment of the invention is presented. In the third section, methods for an exemplary embodiment of the invention are provided. In the fourth section, a particular Internet implementation of the invention is described. Finally, in the fifth section, a conclusion of the detailed description is provided.

Hardware and Operating Environment

Figure 1:
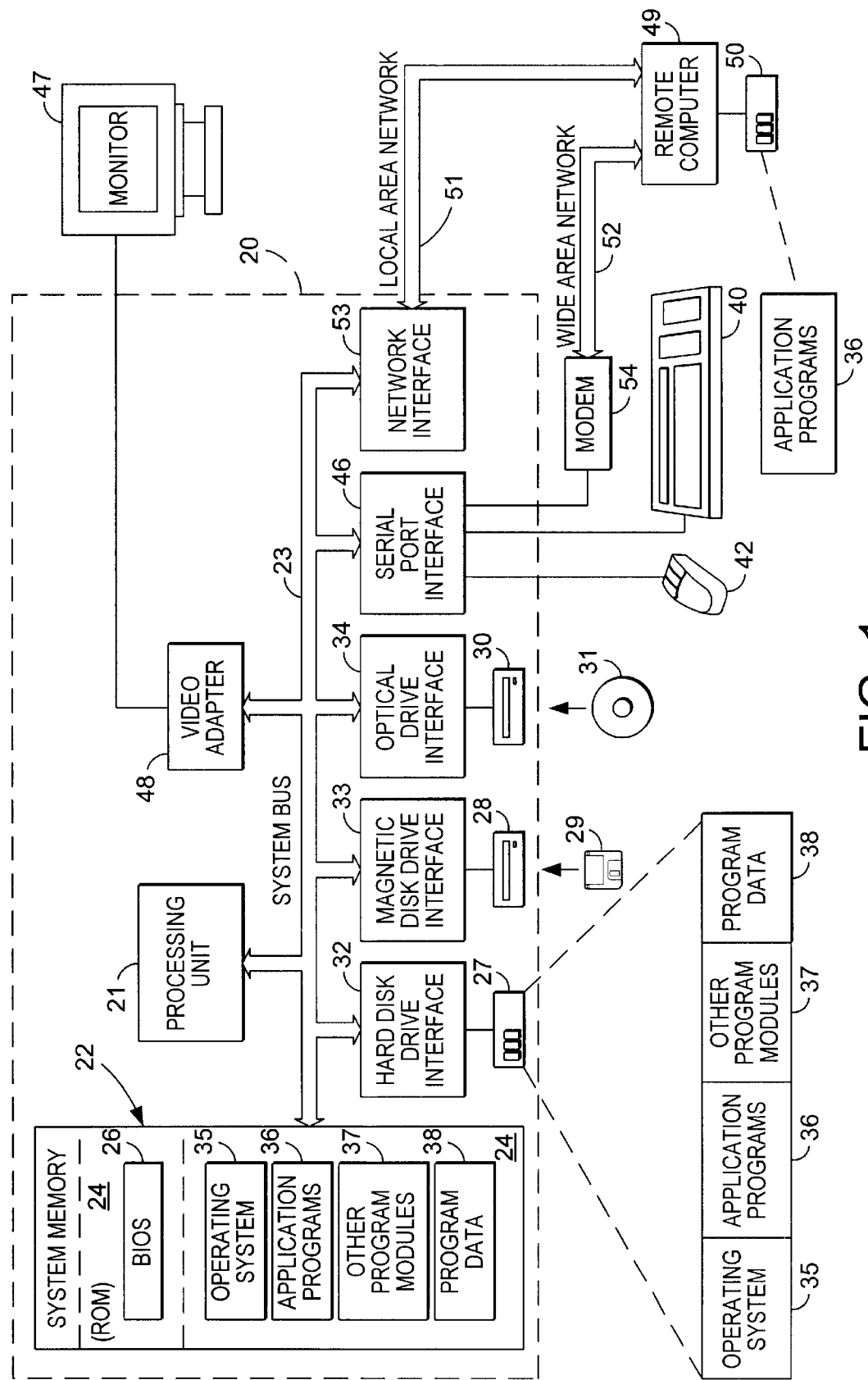
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components, including the system memory 22, to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple to other computers.

System Level Overview

A system level overview of the operation of an exemplary embodiment of the invention is described by reference to FIGS. 2A and 2B. The exemplary embodiment is implemented in a wide-area networking environment 52 having a server computer, such as remote computer 49, and two user or client computers, such as local computer 20, all of which are shown in FIG. 1 and described in the previous section. Alternate exemplary embodiments are described with reference to FIGS. 3, 4, 5A, 5B and 6.

The exemplary embodiments of the invention are described in terms of transactions occurring among three parties in support of the exchange of electronic information, such as text documents, images, executable code, or any other electronic data exchanged between a first party and a second party. The first party originates the information which is subsequently acquired by the second party. The first party and the second party rely on a trusted third party arbitrator to perform services in conjunction with the creation, receipt and use of the information.

Figure 2A:
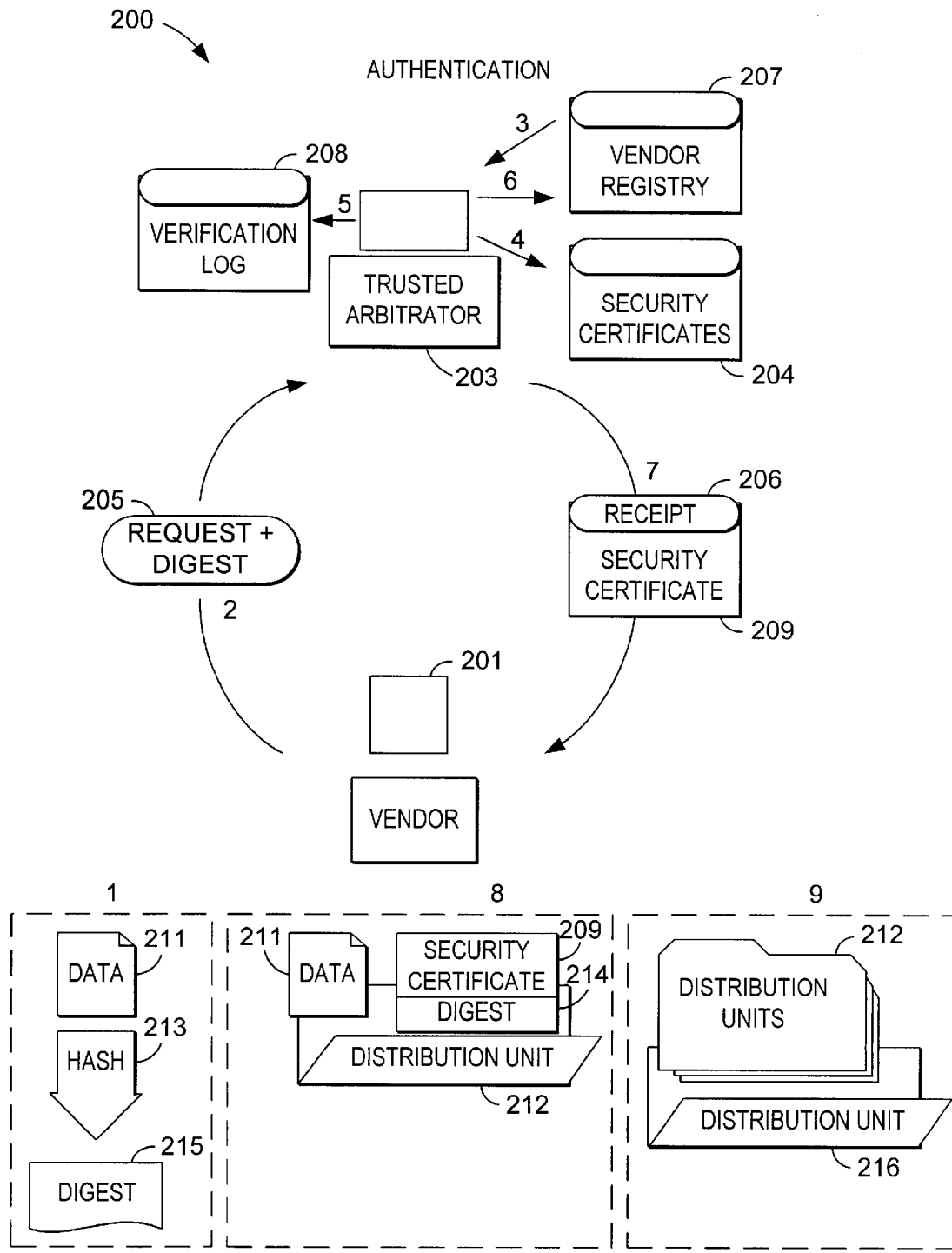
FIGS. 2A and 2B are diagrams illustrating a system-level overview of an exemplary embodiment of the invention.
Figure 2B:
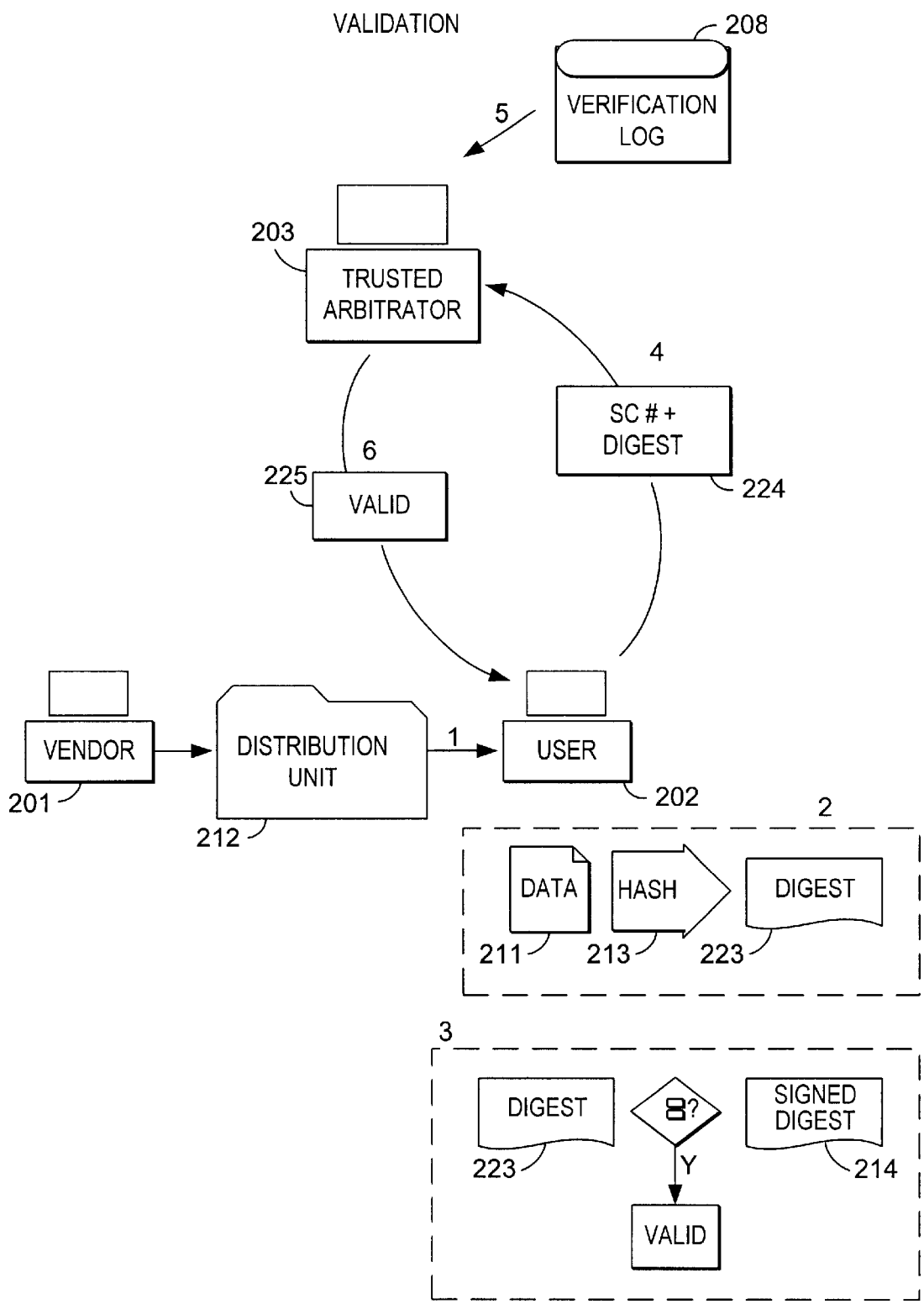

In a first exemplary embodiment shown in FIGS. 2A and 2B, the trusted arbitrator authenticates the first party and validates the information. In a second exemplary embodiment shown in FIG. 3, use of the information by the second party is monitored on behalf of the first party. In a third exemplary embodiment shown in FIG. 4, the licensing of the information to the second party is monitored on behalf of the first party. In a fourth exemplary embodiment shown in FIGS. 5A and 5B, the trusted arbitrator manages the communication of updates to the information by the first party to the second party. In a fifth exemplary embodiment shown in FIG. 6, the trusted arbitrator manages registration and payment for the information by the second party on behalf of the first party.

All communication between the parties and the trusted arbitrator is secure so that no other party can pretend to be the trusted arbitrator and so that the information exchanged is protected.

With reference to FIG. 1, the trusted arbitrator of the following exemplary embodiments can be, for example, the server computer 49, the first and second parties can be client computers 20, and the wide area network 52 can be the Internet. Additionally, the trusted arbitrator is described in the exemplary embodiments as storing and retrieving information. Such information can be stored on any of the types of computer-readable media described in the previous section and can be arranged in any type of data storage format, such as indexed flat files or various types of data bases well known to one of skill in the art.

The trusted arbitrator can be any on-line server which is trusted by the first and second parties. Because the interchange among the parties is based on a digital security certificate which specifies a security service or policy, or a combination thereof, "trusted certificate authorities," such as VeriSign, Inc., AT&T Certificate Services, and Microsoft Root SGC Authority, can act as the trusted arbitrator by expanding their existing services. A digital security certificate serves to uniquely identify the holder. Currently, a trusted certificate authority verifies the identity of a party requesting a digital security certificate using information such as a social security number, addresses, and credit card information. VeriSign, for example, uses Equifax credit information to authenticate a requesting party. The trusted certificate authority can optionally digitally sign the security certificate which decreases the possibility of fraud. The certificate holder attaches the certificate to its documents, both files and data, to authenticate the information as having originated with the certificate holder. As the basics of trusted certificate authorities and digital certificates are well known to one of skill in the art, the following sections discuss the invention's novel application of the concepts.

For purposes of illustration, the information in the exemplary embodiments is a computer application created by the first party, a software vendor such as a developer or company, and acquired by the second party, a computer user. The computer application is distributed in a distribution unit, such as a compressed "cabinet" file frequently used to distribute applications for the Microsoft Windows family of operating systems, which contains all the files necessary to run the application.

In the following exemplary embodiments, the term "vendor" is used interchangeably to mean the actual vendor (individual or company) and the vendor's computer executing software that performs the vendor operations as described below. Similarly, the term "user" is used interchangeably to mean the user (individual or company) and the user's computer executing software that performs the user operations as described below. The meaning will be clear from the context of the sentence.

Referring first to FIG. 2A, the registration transactions occurring between the software vendor 201 and the trusted arbitrator 203 are described. It is assumed that the vendor 201 has previously registered with the trusted arbitrator 203 using current common methodologies. Additional details on the registration process are described in conjunction with FIG. 7 below.

The software vendor generates a digest 215 of the data to be authenticated 211 using a one-way hashing algorithm 213 (transaction 1). A request 205 for a security certificate specifying the desired security services and policies is sent to the trusted arbitrator 203 (transaction 2). The request 205 also contains the digest 215.

The trusted arbitrator 203 time-stamps the information it receives and authenticates the software vendor's 201 credentials contained in the request 205, signs the digest 215, and creates a unique security certificate 209 for the vendor 201. If the vendor's 201 credentials contained in the request 205 cannot be authenticated or the vendor 201 does not have permission for the requested security services or policies, the trusted arbitrator 203 will return an invalid request message (not shown).

The trusted arbitrator 203 authenticates the software vendor's 201 credentials from a vendor registry 207 (transaction 3). The trusted arbitrator 203 creates the security certificate 209 from information in the request 205 from the vendor 201. The trusted arbitrator 203 registers the security certificate 209 in a security certificate registry 204 (transaction 4). The trusted arbitrator 203 registers the timestamp, data file's 211 name, security certificate's 209 serial number and digest 215 into the verification log 208 (transaction 5). The trusted arbitrator 203 adds the security certificate's 209 serial number to the list of security certificates 209 owned by the vendor 201 (transaction 6). The data in the vendor registry 207, verification log 208 and security certificate log 204 are read-only and cannot be changed once entered. The trusted arbitrator 203 returns the security certificate 209 and receipt 206 to the software vendor 201 (transaction 7). In an alternate embodiment, the trusted arbitrator 203 includes a digitally signed digest 214 in the security certificate 209 (shown in phantom).

In the embodiment shown in FIG. 2A, the software vendor 201 acquires a single security certificate 209 for one data file 211 and creates a distribution unit 212 consisting of the data file 211 and its corresponding security certificate 209 (transaction 8). In an alternate embodiment shown in transaction 9, the software vendor 201 creates a nested distribution unit 216 which contains multiple distribution units 212.

In two alternate embodiments not shown in FIG. 2A, the software vendor 201 acquires multiple security certificates and stores them along with their corresponding data files in a single distribution unit, or acquires a security certificate for the distribution unit itself and packages the security certificate along with the distribution unit.

Referring next to FIG. 2B, the authentication and validation transactions occurring between the user 202 and the trusted arbitrator 203 when the user 202 acquires the distribution unit 212 containing the data 211 and security certificate 209 are described. The user 202 acquires the distribution unit either directly from the vendor 201, through a software distributor, or from a location on a wide-area network, such as the Internet (transaction 1). The presence of the security certificate 209 notifies the user 202 that the vendor has been authenticated by a trusted arbitrator. The user 202 validates the data 211 contained in the distribution unit 212 by generating a second digest 223 from the data 211 using the identical one-way hashing algorithm 213 used by the software vendor 201 (transaction 2). In an embodiment in which the security certificate 209 contains a signed digest 214 from the trusted arbitrator 203, the second digest 223 is compared with the signed digest 214. If they match, no action is required from the trusted arbitrator 203 and the data is considered valid (transaction 3). If there is no match, the user 202 can consider the data 211 invalid or can optionally verify the data 211 with the trusted arbitrator that issued the security certificate 209.

When the security certificate 209 does not contain a signed digest 214 or the user 202 wants to validate the data 211 with the trusted arbitrator, the user 202 submits a validation request 224 containing the security certificate's 209 serial number and the second digest 223 to the trusted arbitrator 203 (transaction 4).

The trusted arbitrator 203 reads the entry in the verification log 208 that corresponds to the serial number of the security certificate 209 and compares the first digest 215 stored in the verification log 208 with the second digest 223 send by the user 202 (transaction 5). If the serial number is not found, the trusted arbitrator 203 returns a message to the User 202 that the data 212 is invalid (not shown).

If the first and second digests match, the trusted arbitrator 203 returns a message 225 to the user 202 confirming the validity of the distribution unit 212 (transaction 6). If the first and second digests do not match, the data in the distribution unit 212 has been changed since the first digest 215 was generated and the trusted arbitrator 203 returns a message that the distribution unit 212 is invalid.

Figure 2C:
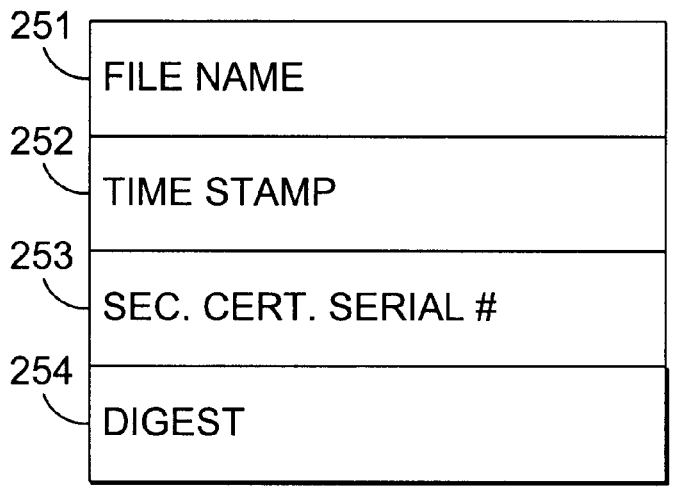
FIG. 2C is a block diagram of one exemplary embodiment of a verification log for use with all exemplary embodiment of the invention.
Figure 2D:
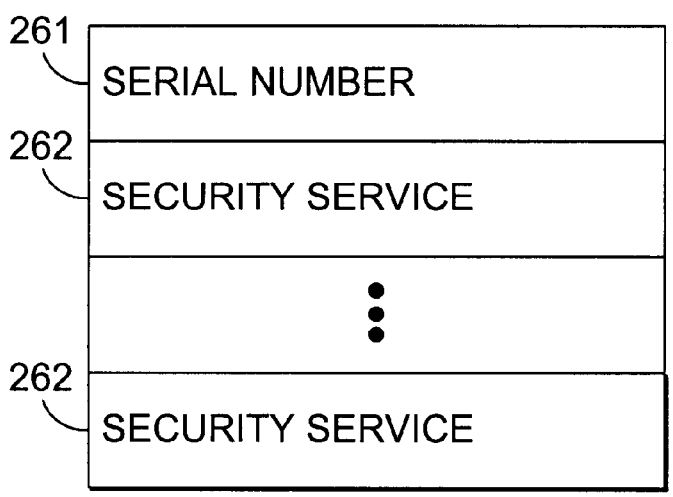
FIG. 2D is a block diagram of a one exemplary embodiment of a security certificate for use with all exemplary embodiments of the invention.

FIG. 2C illustrates one embodiment of a verification log data structure 250 having four data fields: file name 251, timestamp 252, security certificate serial number 253, and data file digest 254. FIG. 2D illustrates one embodiment of a security certificate data structure 260 comprising a serial number field 261 and one or more security services fields 262.

Different types of security services and policy levels can be requested from the trusted arbitrator. The request 205 for a security certificate that provides authentication and validation of a file has been described in conjunction with FIG. 2A. Alternate embodiments that use four other types of security services (copyrighting, licensing, subscription, and consignment) are described next. These security certificates serve to authenticate and validate a file as does the previously described security certificate, but they also cause the trusted arbitrator 203 and user 202 to perform other services after the distribution unit is acquired by the user 202. The vendor 201 can have more than one type of security service permission registered with the trusted arbitrator 203. The transactions invoked by the different security services and policies are described next.

In the following alternate embodiments, the software vendor 201 requests a security certificate specifying the different security services and policies in the same fashion as shown in FIG. 2A for security certificate 205. The remainder of the transactions shown in FIG. 2A also occur as previously described. The transactions described next occur after transactions 1 through 9 of FIG. 2A.

Figure 3:
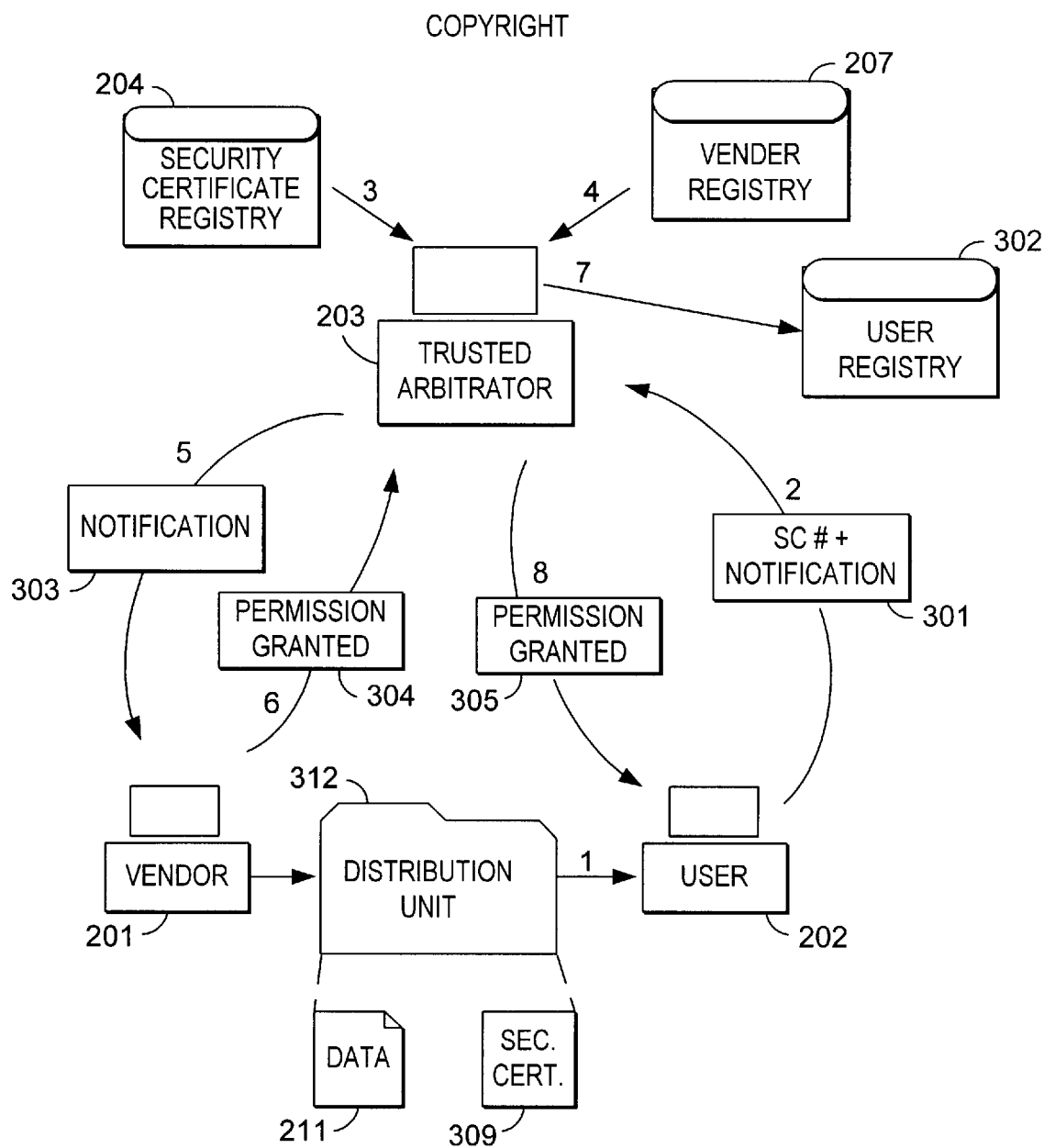
FIGS. 3, 4, 5A, 5B and 6 are diagrams illustrating system-level overviews of alternate embodiments of the invention shown in FIGS. 2A and 2B.

Turning now to FIG. 3, the transactions among the vendor 201, the user 202 and the trusted arbitrator 203 are described when the user 202 acquires a distribution unit 312 containing the data 211 and a security certificate 309 specifying the copyright service (transaction 1). When the user 202 performs an action on the data 211 which invokes the copyright policy in the security certificate 309, depending to the copyright policy specified in the security certificate 309, either 1) the user is warned and not permitted to perform the action if it is against the copyright policy, 2) the vendor 201 is notified through the trusted arbitrator 203 that the action on the data 211 has happened; 3) permission is requested from the vendor 201 through the trusted arbitrator 203 to perform the action on the data 211; or 4) the user is allowed to perform the action on the data 211.

In the second case where the copyright policy specifies that the vendor 201 be notified of a copyright action, the user 202 notifies the trusted arbitrator 203 with a notification message 301 containing the serial number of the security certificate 309 (transaction 2). The trusted arbitrator 203 finds the security certificate 309 in the security certificate registry 204 and checks the copyright policy in the security certificate 309. If the policy states that the vendor 201 be notified, the trusted arbitrator 203 finds the vendor information in the vendor registry 207 (transaction 4) and sends a notification message 303 to the vendor 201 (transaction 5). The trusted arbitrator 203 registers that the user 202 has properly notified the vendor 201 in the user registry 302 (transaction 7). The trusted arbitrator returns a receipt 305 signifying that the vendor 201 has been notified and the user 202 can perform the action on the data 211 (transaction 8).

In the third case where the copyright policy specifies that the vendor 201 must give permission for a copyright action, the user's 202 software notifies the trusted arbitrator 203 with a notification message 301 containing the serial number of the security certificate 309 (transaction 2). The trusted arbitrator 203 finds the security certificate 309 in the security certificate registry 204 and checks the copyright policy in the security certificate 309. If the policy states that the vendor 201 must give permission, the trusted arbitrator 203 finds the vendor information in the vendor registry 207 (transaction 4) and sends a notification message 303 to the vendor 201 (transaction 5). The vendor 201 receives the notification 303 and grants or denies permission for the action. The vendor 201 sends the permission granted or denied message 304 to the trusted arbitrator 203 (transaction 6). The trusted arbitrator 203 registers that the user 202 has be granted or denied the action by the vendor 201 in the user registry 302 (transaction 7). The trusted arbitrator returns a receipt 305 that the vendor 201 has granted or denied permission which is enforced by the user 202.

Figure 4:
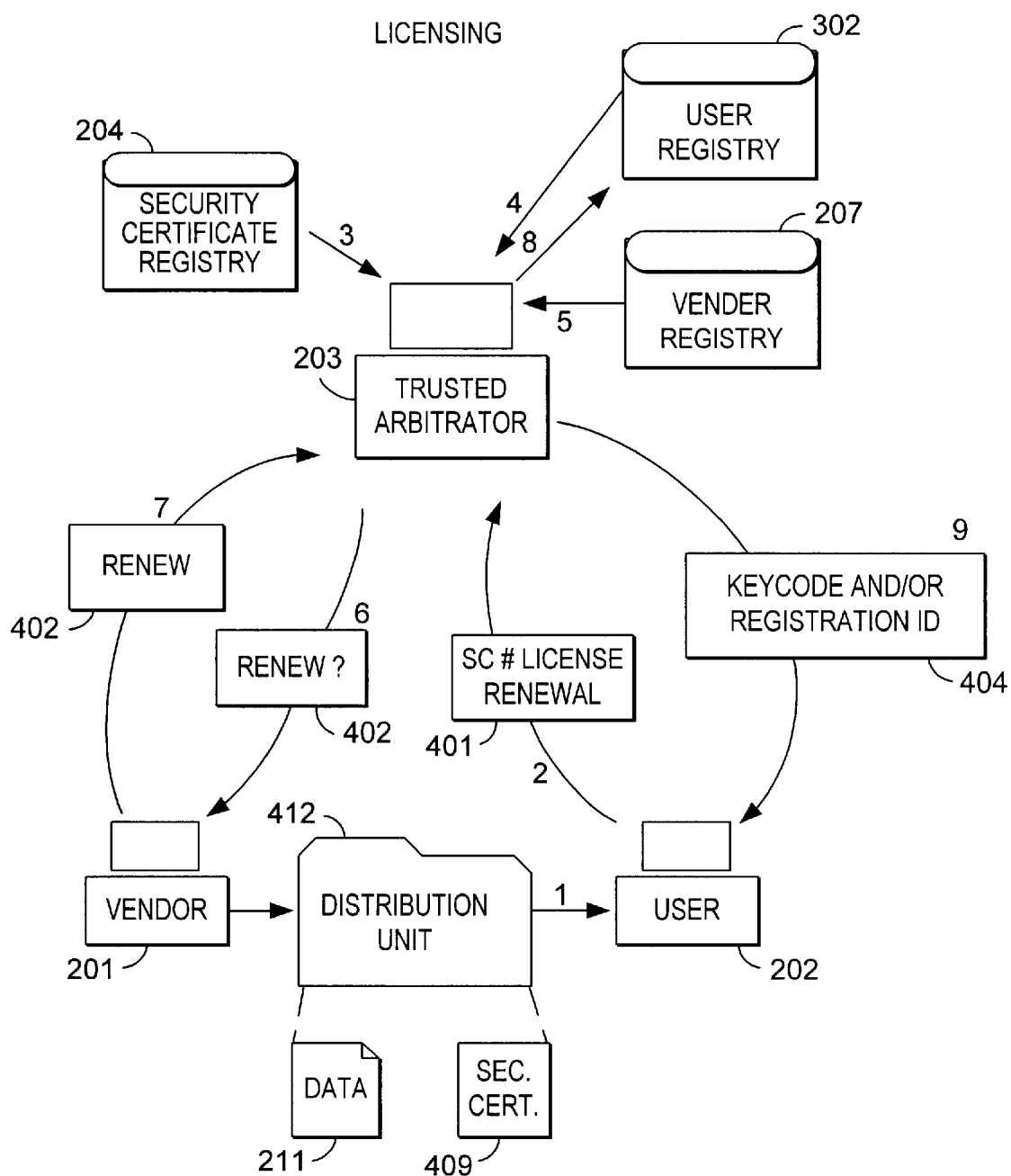

Turning now to FIG. 4, the transactions among the vendor 201, the user 202 and the trusted arbitrator 203 are described when the user 202 acquires a distribution unit 412 containing the data 211 and a security certificate 409 specifying the licensing service (transaction 1). When the user 202 uses the data 211, the presence of a security certificate 409 which specifies the license policy for the data 211 is determined. If the user 202 has a valid license for the data 211, the user 202 can continue.

If the user 202 does not have a valid license for the data 211, a license renewal request message 401 containing the serial number of the security certificate 409 is sent to the trusted arbitrator 203 (transaction 2). The trusted arbitrator 203 finds the security certificate 409 in the security certificate registry 204 and checks the licensing policy in the security certificate 409 (transaction 3). The trusted arbitrator 203 checks if the user's 202 license has been revoked in the user registry 302 (transaction 4).

If the license has been revoked, the trusted arbitrator 203 returns a message to the user 202 that their license has been revoked which causes access to the data 211 to be denied. If the user's 202 license has not been revoked and the licensing policy states that the vendor 201 renew the license, the trusted arbitrator 203 finds the vendor information in the vendor registry 207 (transaction 5) and sends a license renewal request message 402 to the vendor 201 (transaction 6). The vendor 201 can either renew the license or not and return a renewal message 403 to the trusted arbitrator 203 (transaction 7). The trusted arbitrator 203 updates the user registry 302 with the renewal information (transaction 8). If the vendor 201 did not renew the license, the trusted arbitrator 203 informs the user 202 that the license has not been renewed and access to the data 211 is denied. If the vendor 201 renewed the license, the trusted arbitrator 203 sends the license renewal 404 which contains the registration ID or keycode to unlock the software (transaction 9). The user 202 can use the data 211 in accordance with the terms of the license.

Figure 5A:
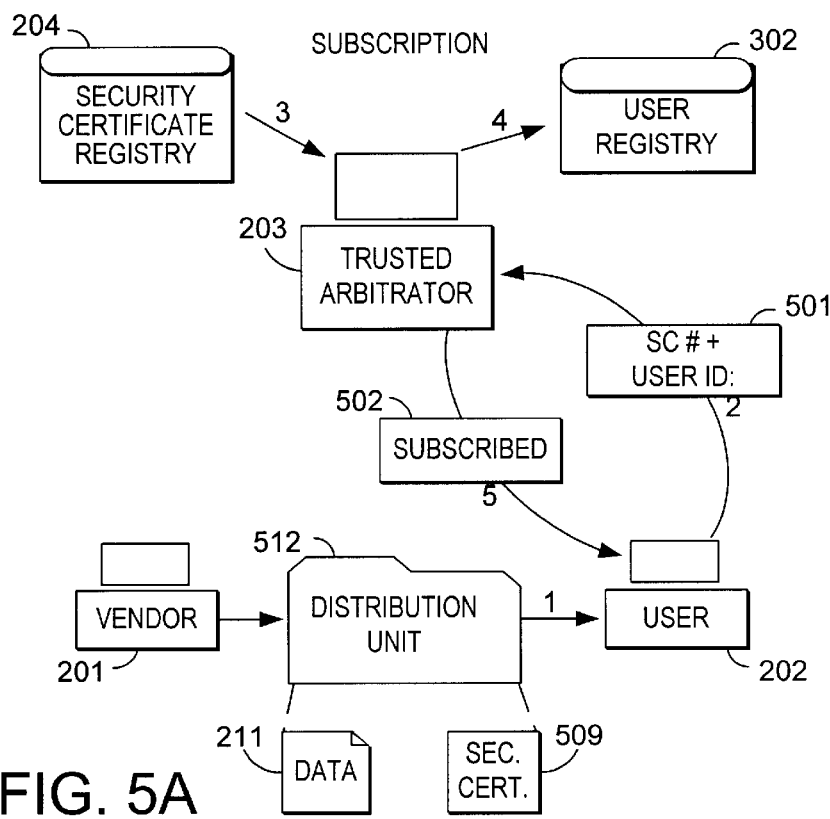
Figure 5B:
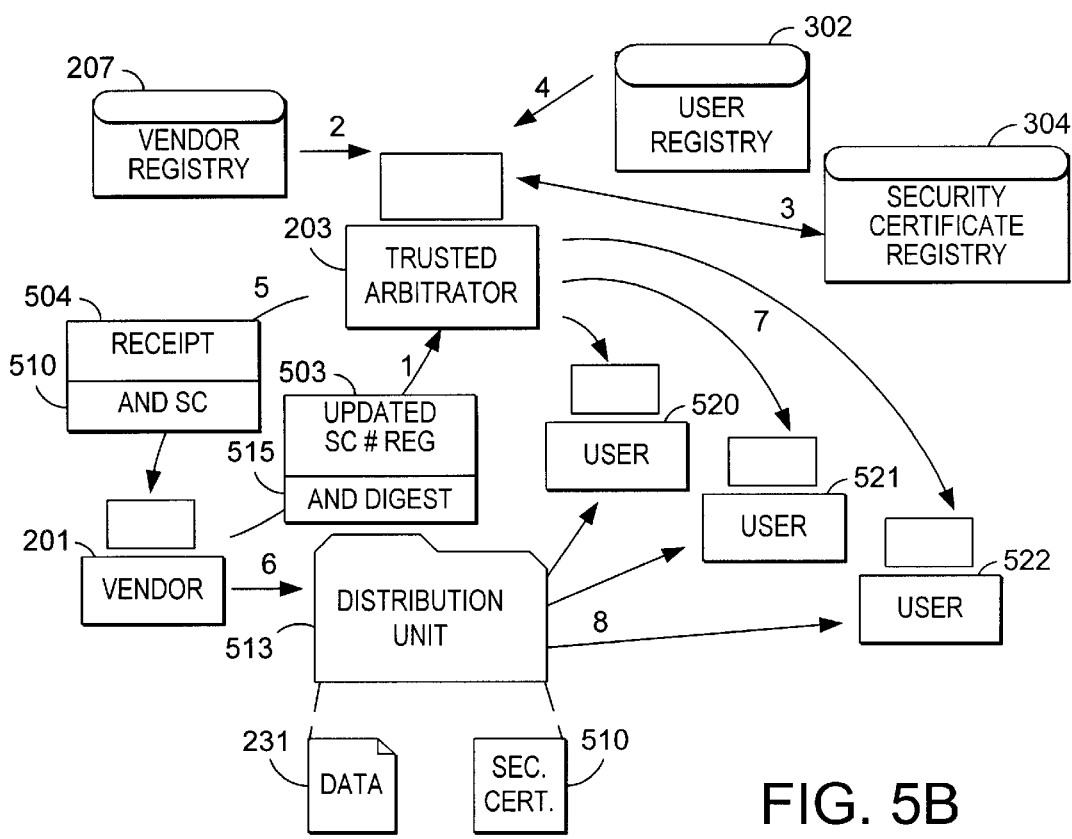

The subscription security service and related transactions are shown in FIGS. 5A and 5B. FIG. 5A shows the transactions among the vendor 201, the user 202 and the trusted arbitrator 203 when the user 202 acquires a distribution unit 512 containing the data 211 and a security certificate 509 specifying the subscription service (transaction 1). The user 202 registers for future updates to the data 211 by sending a subscribe message 501 containing the serial number of the security certificate 509 to the trusted arbitrator 203 (transaction 2).

The trusted arbitrator 203 finds the security certificate 509 in the security certificate registry 204 and checks the subscription policy in the security certificate 509 (transaction 3). The trusted arbitrator 203 adds the user 202 as a subscriber to the data 211 listed in the security certificate 509 to the user registry 302 (transaction 4). The trusted arbitrator 203 returns a subscription receipt 502 to the user 202 (transaction 5).

Update notification for multiple subscribed users 520, 521, 522 is illustrated in FIG. 5B. When the vendor 201 updates the data 211, i.e., creates data 231, the vendor 201 computes a new digest 215 using the one-way hash algorithm 213. The vendor 201 sends an updated subscription message 503 which contains the serial number of the original security certificate 509 and the new digest 215 (transaction 1). The trusted arbitrator 203 validates the vendor's 201 credentials in the vendor registry 207 (transaction 2). The trusted arbitrator 203 updates the security certificate registry 204 to record that a new subscription of the data 211 occurred (transaction 3). The trusted arbitrator 203 creates a list of all users 202 subscribed to the data 211 from the user registry 302 (transaction 4). A subscription update receipt 504 containing the new security certificate 510 and optionally containing the list of users 520–522 who are subscribed to the data 211 is returned to the vendor 201 (transaction 5). The vendor 201 creates a new distribution unit 513 from the data 231 and security certificate 510 and publishes it in the same manner as the original distribution unit 512 (transaction 6). The trusted arbitrator 203 informs the users 520–522 that the data 211 which they subscribed to has been updated (transaction 7). The users 520–522 retrieve the new distribution unit 513 (transaction 8).

Figure 6:
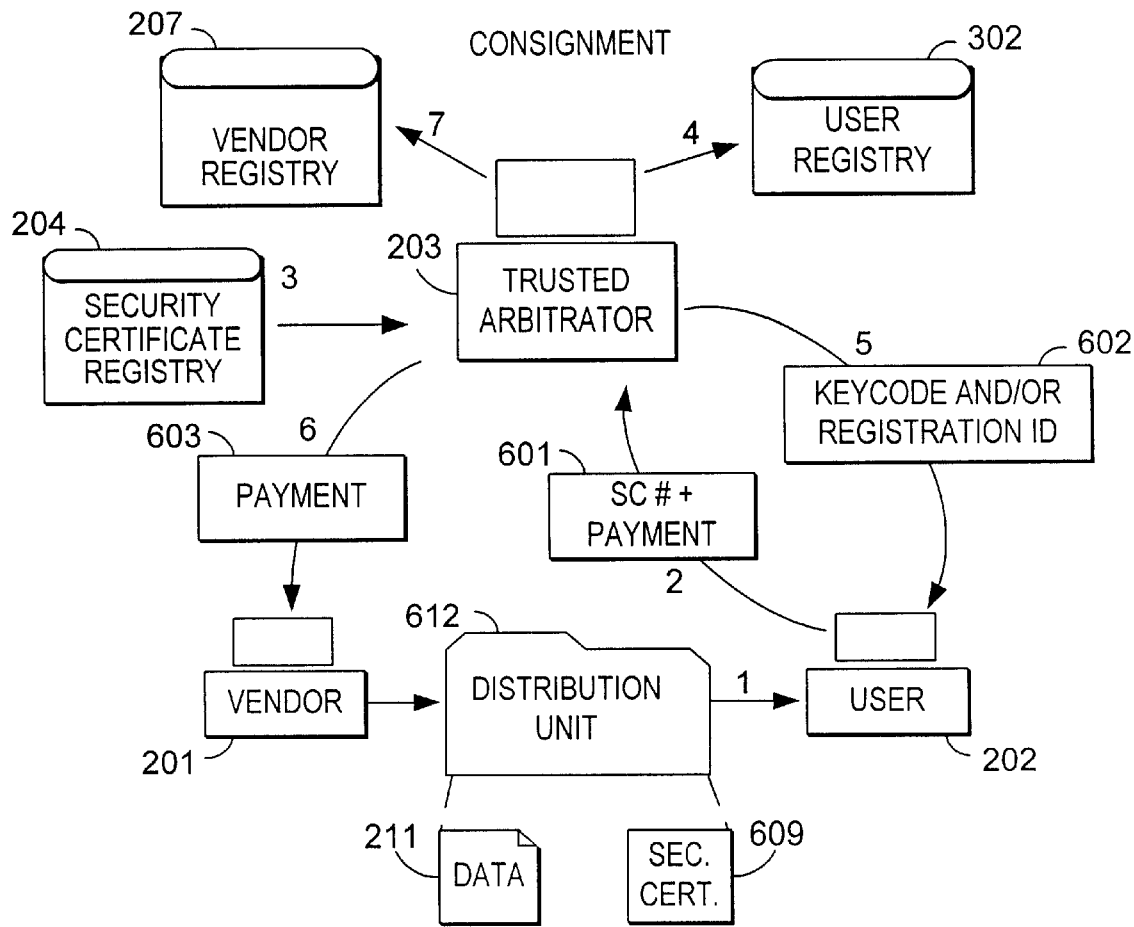

A security certificate 609 that specifies the consignment service and related transactions among the vendor 201, the user 202, and the trusted arbitrator are shown in FIG. 6. The user 202 acquires a distribution unit 612 containing the data 211 and a security certificate 609 specifying the consignment service (transaction 1). When the user 202 uses the data 211, the presence of security certificate 609 specifying a consignment policy for the data 211 is determined. If the user 202 has paid for the data 211, the user 202 can continue.

If the user 202 has not paid for the data, a payment message 601 containing the serial number of the security certificate 609 and payment information is sent to the trusted arbitrator 203 (transaction 2). The trusted arbitrator 203 finds the security certificate 609 in the security certificate registry 204 and checks the consignment policy in the security certificate 609 (transaction 3). The trusted arbitrator 203 updates the user registry 302 that the user has paid for the distribution unit 612 (transaction 4). The trusted arbitrator returns a receipt 602 containing the registration ID or keycode to unlock the data 211 (transaction 5). The trusted arbitrator sends the payment information 603 to the vendor 201 (transaction 6). The trusted arbitrator updates the vendor registry 207 that a payment for data 211 has been made (transaction 7).

Further details on differing types of security services and use policy levels provided by the trusted arbitrator and the intermixing of different security services and policies in a security certificate are discussed in the next section. The use of types of security certificates other than described above will be readily apparent to one skilled in the art and are contemplated as within the scope of the invention.

The system level overview of the operation of exemplary embodiments of the invention has been described in this section of the detailed description. A series of transactions among parties that provide security services and policy enforcement for the distribution and use of electronic data has been described. For sake of clarity a simplified version of protecting software applications distributed across the Internet has been described. The invention is not, however, limited to use in distributing computer software across a network but will be immediately perceived as applicable to any exchange of files or documents which must be authenticated or validated in some fashion, such as legal papers, tax filings, employment records, or the like. Furthermore, although the distribution unit used for illustrative purposes in this section contains a single distribution unit, the ability to have multiple distribution units in a distribution unit, or to nest distribution units is also contemplated by the invention.

Methods of an Exemplary Embodiment of the Invention

In the previous section, a system level overview of the operation of an exemplary embodiment of the invention was described. In this section, the particular methods performed by a server or remote computer of such an exemplary embodiment are described by reference to a series of flowcharts. The methods to be performed by the server computer constitute computer programs made up of computer-executable instructions. Describing the methods by reference to a flowchart enables one skilled in the art to develop such programs including such instructions to carry out the methods on suitable computerized servers (the processor of the clients/server executing the instructions from computer-readable media). Also in this section, the particular methods performed by two client (vendor and user) or local computers of such an exemplary embodiment are described by reference to a series of flowcharts. The methods to be performed by the client computers constitute computer programs made up of computer-executable instructions. Describing the methods by reference to a flowchart enables one skilled in the art to develop such programs including such instructions to carry out the methods on suitable computerized clients (the processors of the clients executing the instructions from computer-readable media).

Trusted Arbitrator Server

FIGS. 7, 8, 9, 10, 11, 12A, 12B and 13 illustrate flowcharts of methods to be performed by a server computer providing the services of the trusted arbitrator according to the exemplary embodiments of the invention discussed in the previous section in conjunction with FIGS. 2A, 2B, 3, 4, 5 and 6. These methods are inclusive of the steps or acts required to be taken by the trusted arbitrator server computer using the components discussed in the previous section.

Figure 7:
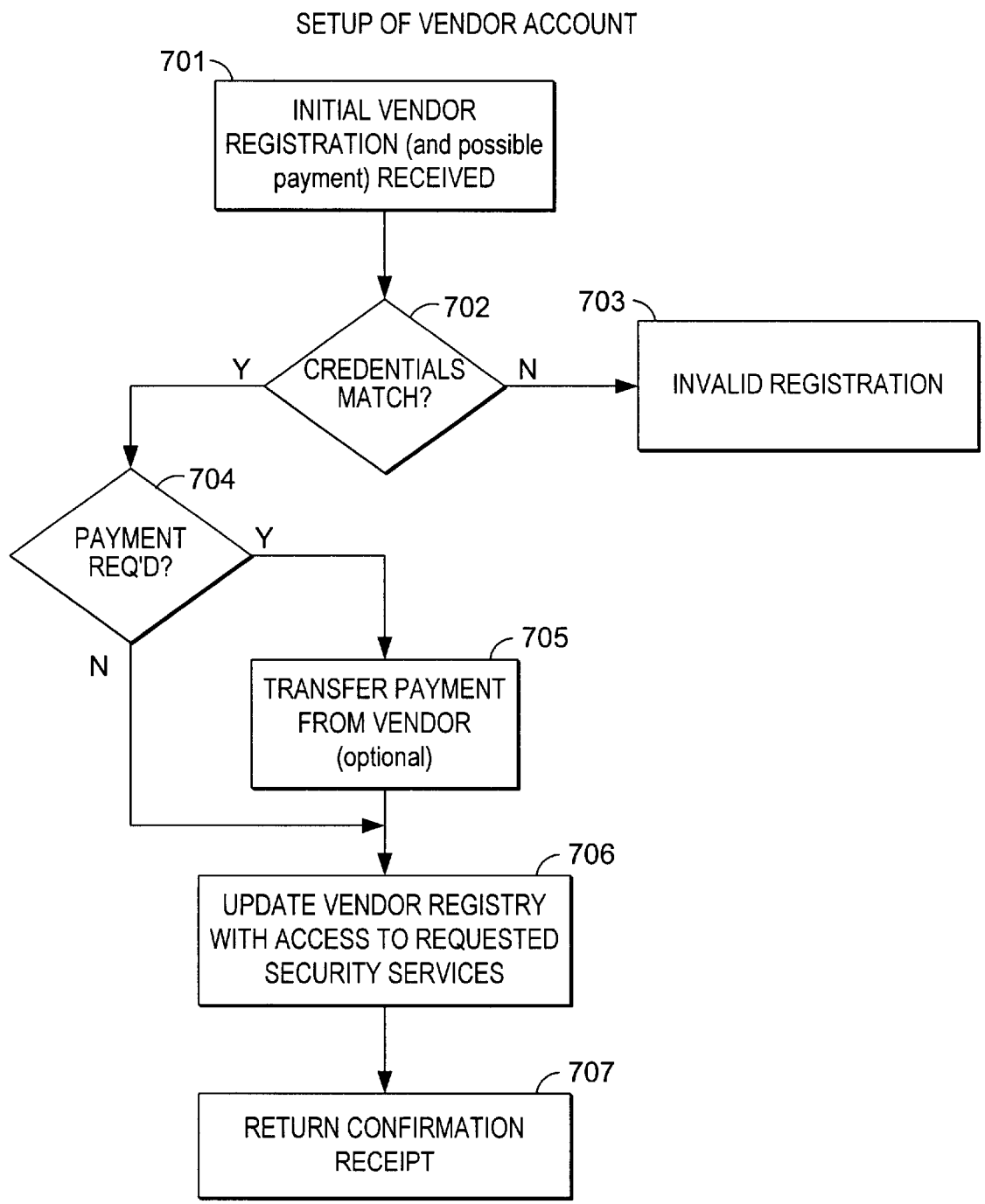
FIGS. 7, 8 and 9 are flowcharts of methods to be performed by a server according to an exemplary embodiment of the invention.
Figure 8:
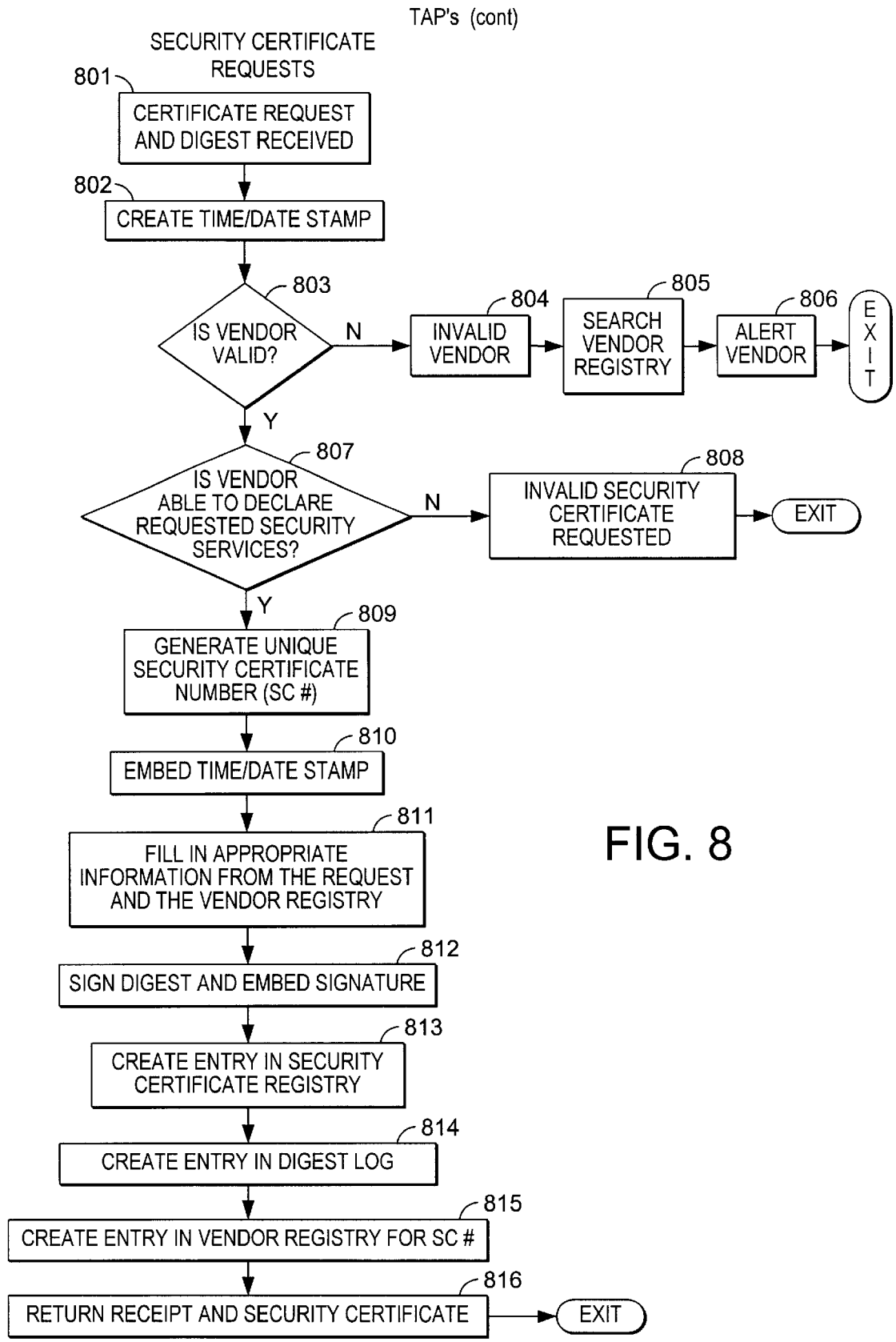

Beginning with FIG. 7, when the vendor first registers with the trusted arbitrator, the trusted arbitrator receives a vendor registration along with a possible payment (step 701). The trusted arbitrator checks the credentials of the vendor to see if they are valid (step 702). If the credentials do not match, then the trusted arbitrator returns an invalid registration message (step 703). If the credentials match, the trusted arbitrator transfers the payment from the vendor if required (steps 704 and 705). The trusted arbitrator adds the vendor to the vendor registry along with the services the vendor has registered (step 706). The trusted arbitrator returns a confirmation receipt to the vendor (step 707).

In one embodiment, the trusted arbitrator places a "cookie" that is specific to the arbitrator and the vendor's computer on the vendor's computer and stores the cookie contents in the vendor registry for future authentication of the vendor. In an alternate embodiment, the trusted arbitrator transmits a password unique to the vendor and stores the password in the vendor registry so that the vendor can be authenticated using the password.

When the vendor requests a security certificate from the trusted arbitrator (referring to FIG. 8), the trusted arbitrator receives a certificate request and digest (step 801). The trusted arbitrator records the time and date of receipt (step 802). The vendor is authenticated against the vendor registry (step 803). If vendor cannot be authenticated, then the request is from an invalid vendor (step 804). The trusted arbitrator searches the vendor registry for the correct vendor (step 805) and notifies them of the invalid request (step 806). The invalid vendor is also notified with the reason their request was not granted.

If the vendor is valid, then the trusted arbitrator verifies that the vendor is permitted to declare the security service requested (step 807). If the vendor does not have permission to declare the security service requested, the trusted arbitrator returns an invalid security certificate message (step 808).

If the request is valid, then the trusted arbitrator creates the security certificate by generating a unique security certificate number (step 809); embedding the time and date stamp (step 810); filling in the appropriate information from the request and the vendor registry (step 811); and optionally, embedding the digitally signed digest into the certificate (step 812 shown in phantom). The trusted arbitrator writes the security certificate information to the security certificate registry (step 813); writes the security certificate serial number and digest to the verification (digest) log (step 814); and adds the security certificate serial number to the vendor's entry in the vendor registry (step 815). A receipt containing the security certificate is returned to the vendor (step 815).

Figure 9:
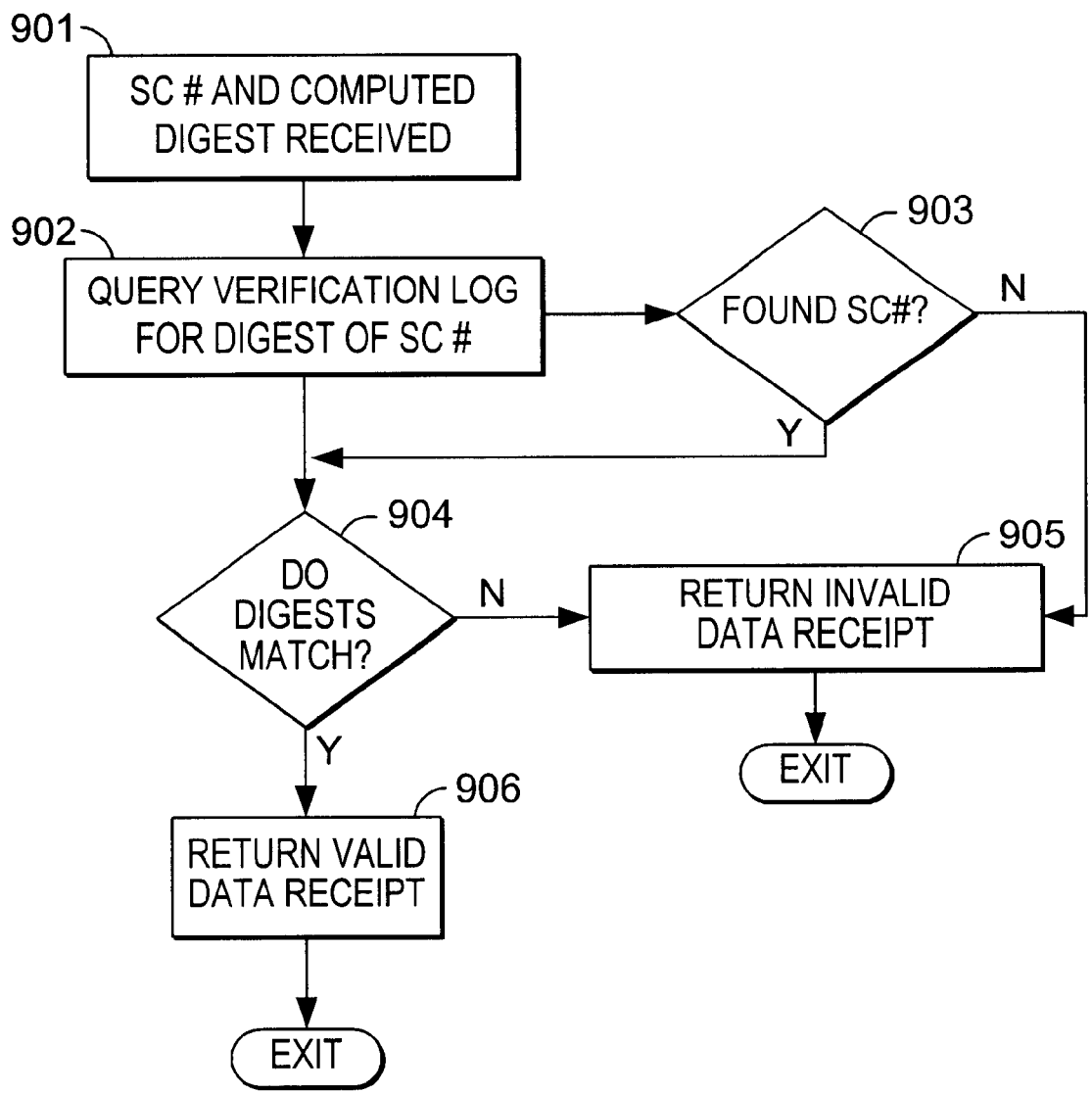
Figure 10:
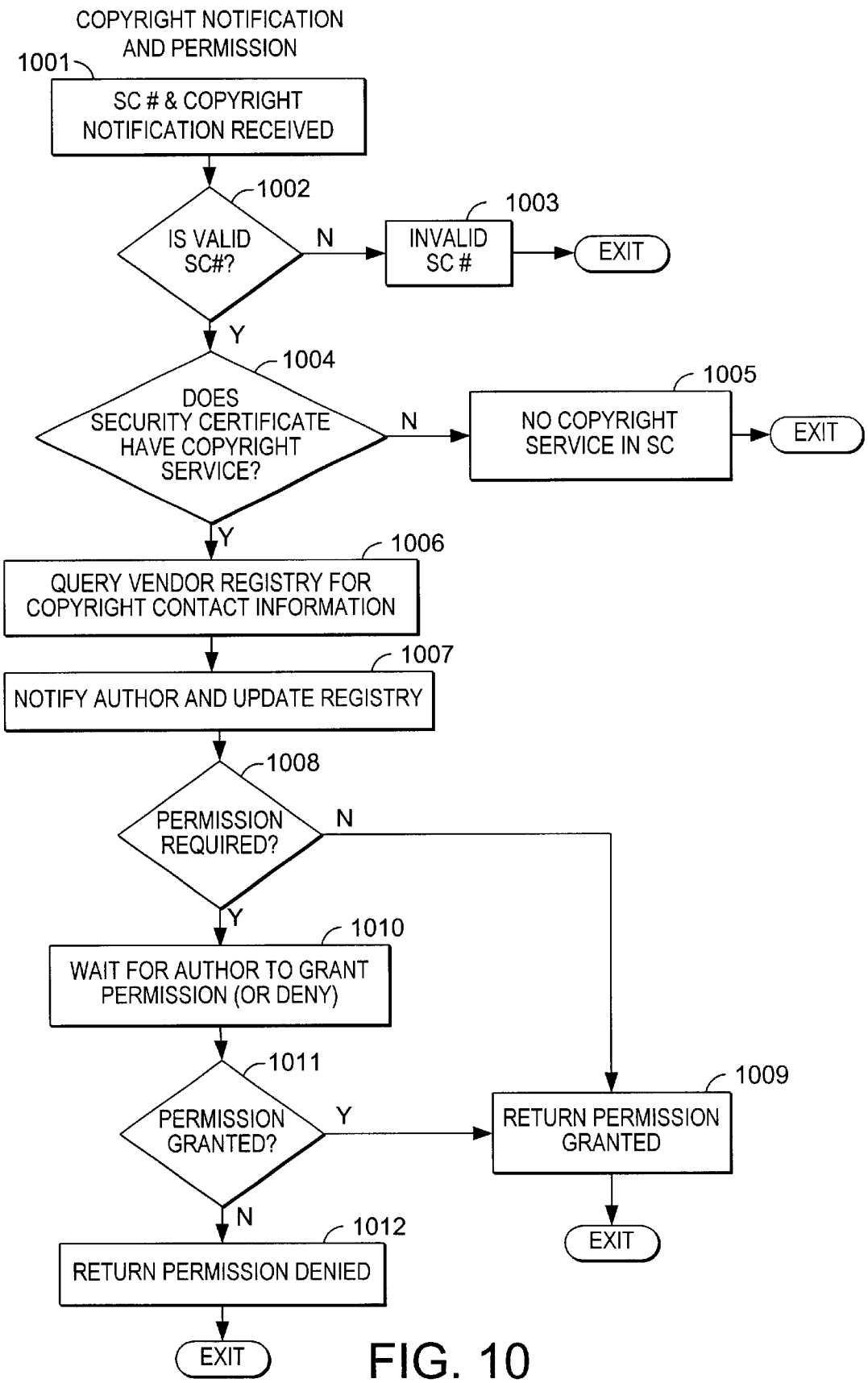
FIGS. 10, 11, 12A, 12B and 13 are flowcharts of methods to be performed by a server according to alternate embodiments of the invention.

Turning now to FIG. 9, under certain circumstances as described above and in more detail below, when the user needs to validate the data received in a distribution unit, the trusted arbitrator receives a validation request containing the security certificate serial number and computed digest from the user (step 901). The trusted arbitrator queries the verification log for the digest of the security certificate serial number (step 902). If the security certificate serial number is not found in the verification log (step 903) or if the digests do not match (step 904), then the trusted arbitrator returns an invalid data receipt (step 905). If the digests match, then the data is valid and the trusted arbitrator returns a valid data receipt (step 906).

When the user of data associated with a security certificate specifying the copyright service invokes the notification or permission policy through an action, the trusted arbitrator receives a copyright notification message containing the security certificate serial number to the trusted arbitrator (step 1001). The trusted arbitrator checks if the security certificate serial number is a valid number (step 1002) in the security certificate registry. If not, it is an invalid security certificate serial number (step 1003). The user is notified that the trusted arbitrator could not find the serial number (not shown). Under these circumstances, any copyright policies on the document cannot be enforced so the data is treated as if it is not copyrighted.

For a valid security certificate, the trusted arbitrator checks if the security certificate specifies the copyright service (step 1004). If not, the trusted arbitrator returns a message telling the user that the file is not copyrighted (step 1005). If copyright information exists, then the trusted arbitrator queries the vendor registry for the copyright contact information (step 1006). The trusted arbitrator notifies the vendor contact that the copyright policy has been invoked by the user and updates the user registry (step 1007).

If permission from the vendor is not required (step 1008), then the trusted arbitrator grants permission to the user (step 1009), else the trusted arbitrator waits for the author to grant or deny permission (step 1010). The trusted arbitrator adds the vendor's reply to the user registry (step 1011) and sends a message to the user either granting (step 1009) or denying (step 1012) permission to continue.

Figure 11:
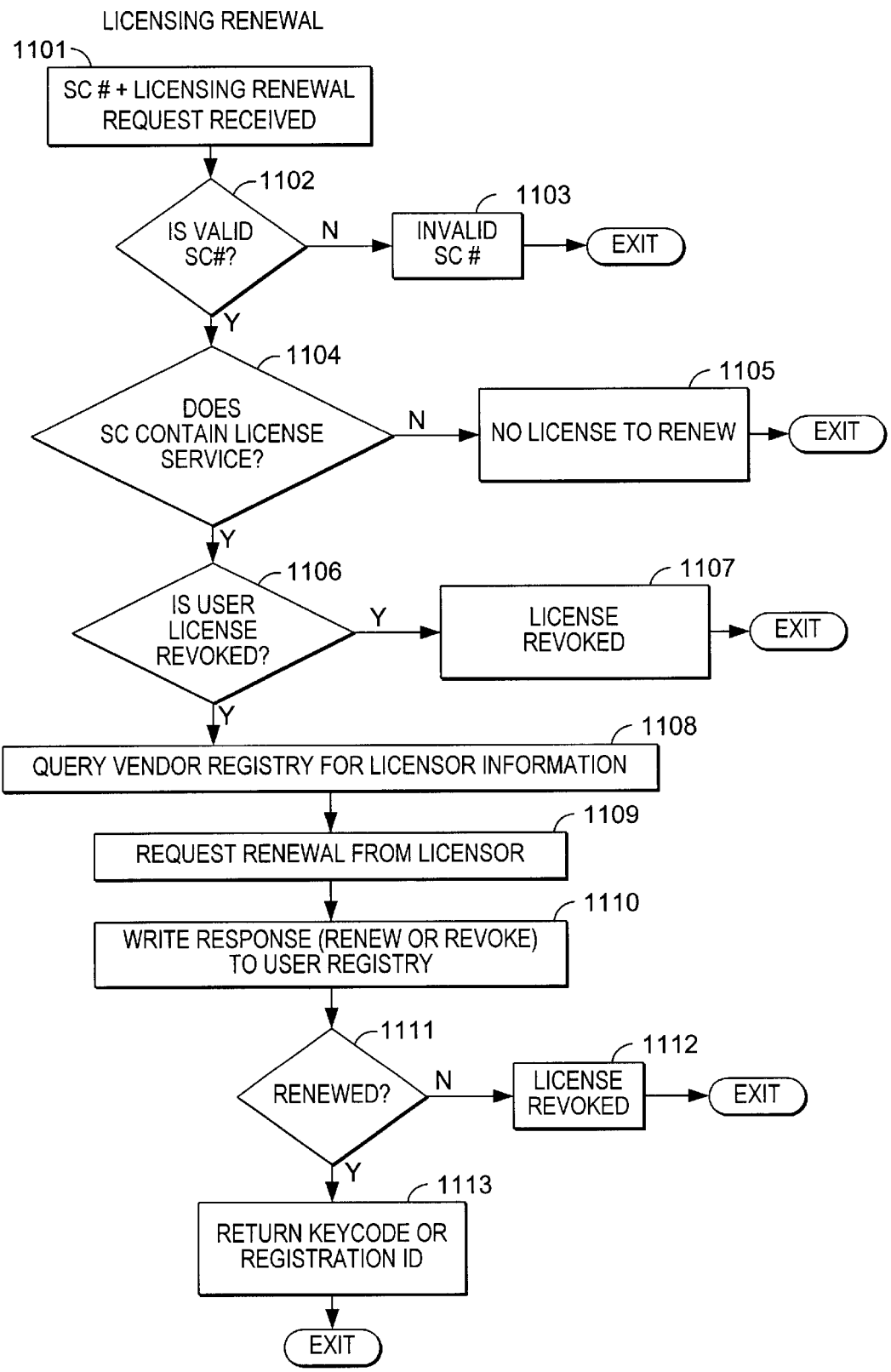

As described above and in more detail below, when the user attempts to use data which is associated with a security certificate specifying the license service and the license is invalid, the trusted arbitrator receives a license renewal request containing the security certificate serial number (step 1101 in FIG. 11). The trusted arbitrator checks if the security certificate serial number is a valid number (step 1102) in the security certificate registry. If not, it is an invalid security certificate serial number (step 1103). The user is notified that the Trusted arbitrator could not find the serial number (not shown). Any license policies on the document cannot be enforced and the data is treated as if it is not subject to licensing.

When the security certificate is valid, the trusted arbitrator checks if the security certificate specifies the license service (step 1104). If not, the trusted arbitrator returns a message telling the user that the file is not licensed (step 1105). If license information exists, the trusted arbitrator checks if the user's license to use the software has been revoked in the user registry (step 1106). If the user's license has been revoked, the trusted arbitrator returns a license revoked message to the user's computer (step 1107) which results in the user being unable to access the data.

If the license is not revoked, the trusted arbitrator queries the vendor registry for the licensor information (step 1108). The trusted arbitrator requests a license renewal from the licensor and waits for the licensor to renew or revoke the license (step 1109). The trusted arbitrator adds the licensor's reply to the user registry (step 1110) and either revokes the license as described immediately above (step 1112) or renews the license by sending a registration ID or keycode to unlock the software (step 1113).

Figure 12A:
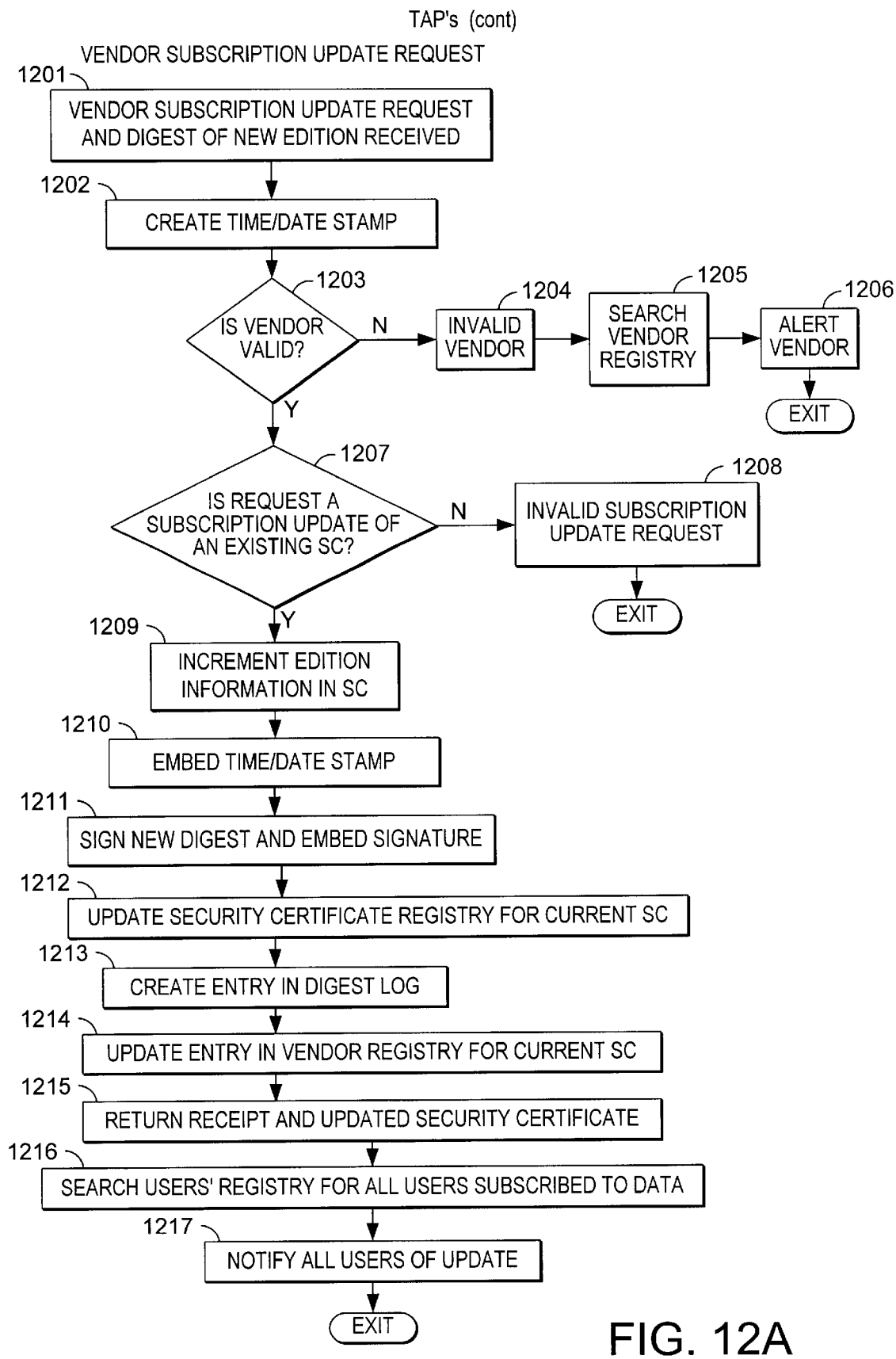

As shown in FIG. 12A, when the vendor modifies periodically-updated data associated with a security certificate specifying the subscription service modifies the data, the vendor notifies the trusted arbitrator with a subscription update request containing the newly calculated digest of the modified material (step 1201). The trusted arbitrator time and date stamps the request (step 1202) and checks the vendor's credentials to see if the vendor is valid (step 1203). If the vendor is not valid (step 1204), the trusted arbitrator searches for the real vendor in the vendor registry (step 1205) and alerts the real vendor (step 1206).

If the vendor is valid, the trusted arbitrator checks if the subscription update request is for an existing security certificate (step 1207). If not, the trusted arbitrator returns a message that the subscription update request is invalid (step 1208). If the subscription update request is valid, the trusted arbitrator updates the edition information in the verification (digest) log (step 1209), embeds the time and date stamp (step 1210), and, optionally, digitally signs the new digest and inserts the signature in the security certificate (step 1211 shown in phantom). The trusted arbitrator updates the serial number of the security certificate in the security certificate registry (step 1212), creates a new entry in the verification (digest) log (step 1213), and adds the new security certificate serial number to the vendor's security certificates in the vendor registry (step 1214). The trusted arbitrator returns a receipt containing the updated security certificate (step 1215). The trusted arbitrator searches the user's registry for all users subscribed to the data (step 1216) and notifies them of the updated document (step 1217).

Figure 12B:
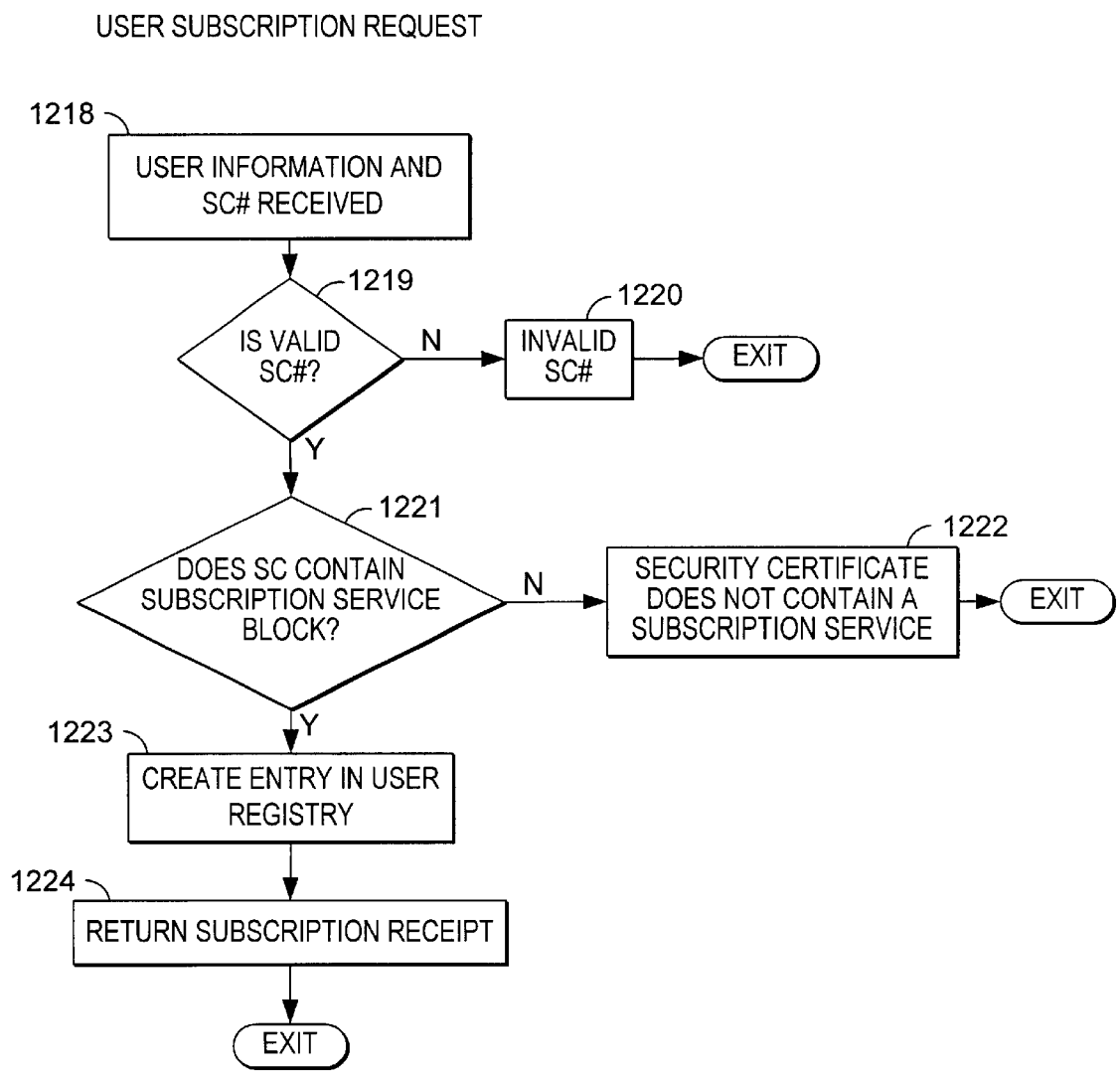

Continuing on to FIG. 12B, the user of data associated with a security certificate specifying the subscription service can subscribe to be notified of updates to the data by sending a user subscription request to the trusted arbitrator (step 1218). The trusted arbitrator checks if the user subscription request is for an existing security certificate (step 1219). If not, the trusted arbitrator returns a message that the data does not exist (step 1220).

When the data does exists, the trusted arbitrator checks if the security certificate contains the subscription service block (step 1221). If not, the trusted arbitrator returns a message that the data cannot be subscribed to (step 1222). If the security certificate contains a subscription service block, the trusted arbitrator updates the user registry for subscribers to the security certificate serial number (step 1223) and returns a subscription receipt (step 1224).

Figure 13:
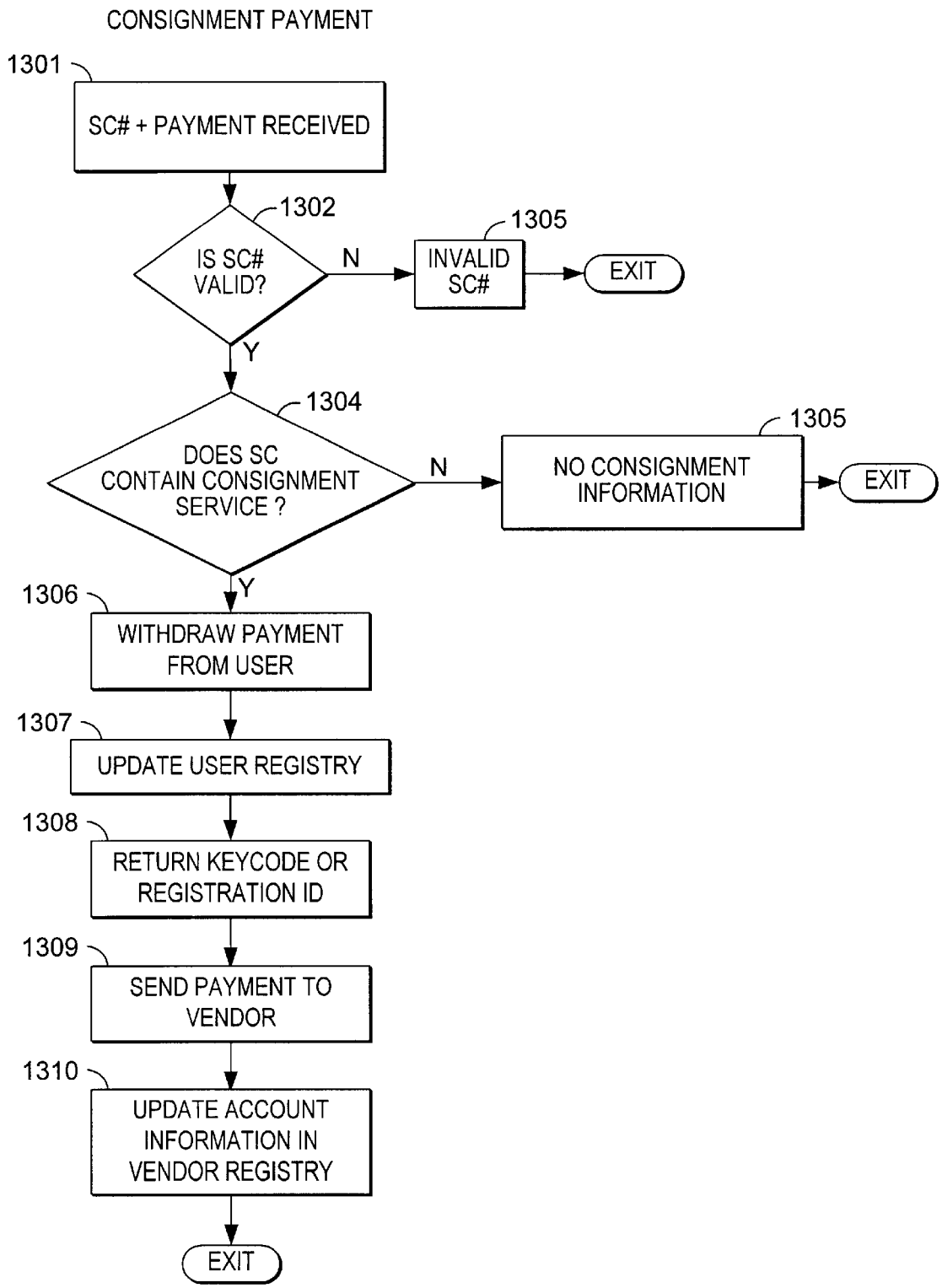

As described above and in more detail below, when the user of data associated with a security certificate that specified the consignment service receives the data without a valid license to use the data, the user can purchase the data. FIG. 13 illustrates the method used by the trusted arbitrator if the user chooses to purchase the data. The trusted arbitrator receives consignment payment request containing the security certificate serial number and payment information (step 1301). The trusted arbitrator checks if the security certificate serial number is a valid number (step 1302) in the security certificate registry. If not, it is an invalid security certificate serial number (step 1303). The user is notified that the trusted arbitrator could not find the serial number (not shown). Any consignment policies on the document cannot be enforced and the data is treated as if it is not on consignment.

For a valid certificate, the trusted arbitrator checks if the security certificate specifies the consignment service (step 1304). If not, the trusted arbitrator returns a message telling the user that the file is not on consignment (step 1305). If consignment information exists, the trusted arbitrator withdraws payment from an account maintained by the user (step 1306) and updates the user registry to indicate that the user has paid (step 1307). The trusted arbitrator returns a registration ID or keycode to unlock the software (step 1308), sends a payment to the vendor (step 1309) and updates the account information in the vendor registry (step 1310).

Vendor Client

Figure 14:
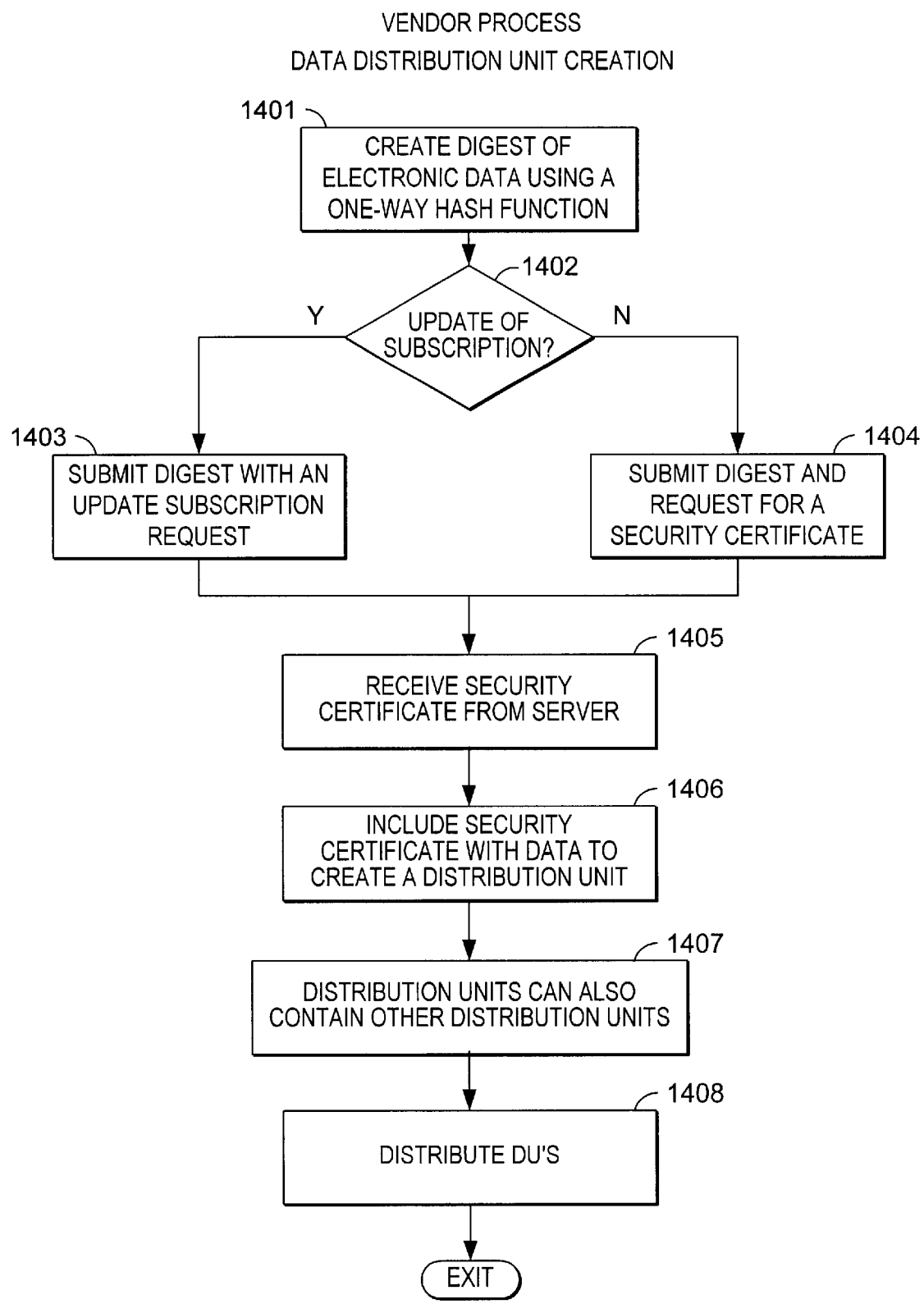
FIG. 14 is a flowchart of methods to be performed by an originating client according to all embodiments of the invention.

A flowchart of a method to be performed by a client computer on behalf of a vendor according to the exemplary embodiments of the invention is shown in FIG. 14. The method is inclusive of the steps or acts required to be taken by the vendor client computer using the components discussed in the previous section.

The vendor client computer applies a one-way hashing algorithm to the electronic data to create a digest of the data (step 1401). If the client is updating existing data associated with a security certificate specifying the subscription service (step 1402), the vendor client computer creates a subscription update request from the vendor's credentials and desired types of services and policy levels, and submits the request with the digest to the server (step 1403). If the data is not a subscription update of existing data, the vendor client computer creates a new security certificate request from the vendor's credentials and desired types of services and policy levels and submits the request with the digest to the server (step 1404).

In either case, when the security certificate is received from the trusted arbitrator (step 1405), the vendor client computer combines the security certificate with the data to form a distribution unit (step 1406). Distribution units may optionally be combined with other distribution units to form nested distribution units (step 1407 shown in phantom). The vendor client distributes the distribution unit containing the data and security certificate (1408).

User Client

FIGS. 15, 16, 17, 18 and 19 illustrate flowcharts of methods to be performed by a client computer on behalf of a user according to the exemplary embodiments of the invention. These methods are inclusive of the steps or acts required to be taken by the user client computer using the components discussed in the previous section.

When a distribution unit is loaded, the user client computer extracts the security certificate from the distribution unit to determine which services to perform. For example, if the certificate allows a thirty-day trial period but requires payment after that, the client notes the date the information is installed so that it can alert the user when the time period has expired. Other additional operations necessary to support the security services and policy enforcement will be readily apparent to one of skill in the art upon reading the detailed description of the various security types and policy levels below. The data can require the client perform an installation process prior to the data being used or if the distribution unit is a compressed file, the client must uncompress the data. If textual data is distributed in word processor compatible distribution unit, such as a Microsoft Word document, no additional processing is required.

Thus, FIGS. 15, 16, 17, 18 and 19 all begin with the acquisition of a distribution unit and the extraction of the security certificate to determine the security services and policies specified therein. The method used by the user client computer's is dictated by the type of security certificate. Because the security services and policies can be combined in various permutations, the methods described below are also combined as required by the specific security certificate.

Figure 15:
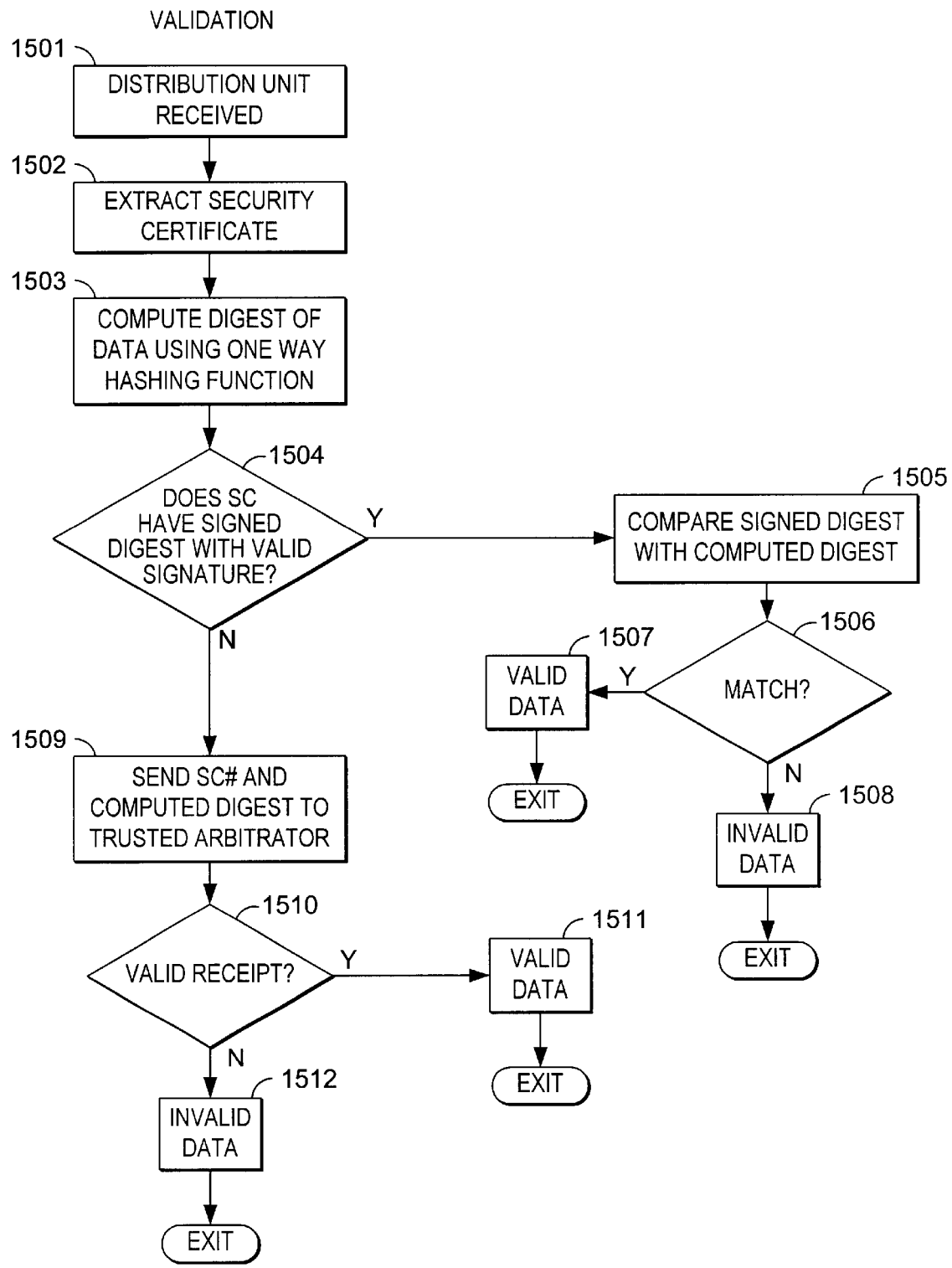
FIG. 15 is a flowchart of methods to be performed by an acquiring client according to an exemplary embodiment of the invention.

Turning first to FIG. 15 and a distribution unit containing a security certificate which specifies the validation service (step 1501), the user client computer validates the data by extracting the security certificate (step 1502) and computing a digest from the data using a one-way hashing function (step 1503). If the security certificate contains a signed digest from a trusted arbitrator that the user client computer can verify as correct (step 1504), the user client computer will compare the signed digest with the computed digest (step 1505). If the digests match (step 1506), the data are valid (step 1507), else the data are invalid (step 1508).

If there is no signed digest in the file, then the user client computer sends a validation request message containing the security certificate serial number and the computed digest to the trusted arbitrator (step 1509). If the trusted arbitrator returns a valid receipt (step 1510), the data are valid (step 1511), else the data are invalid (step 1512).

Figure 16:
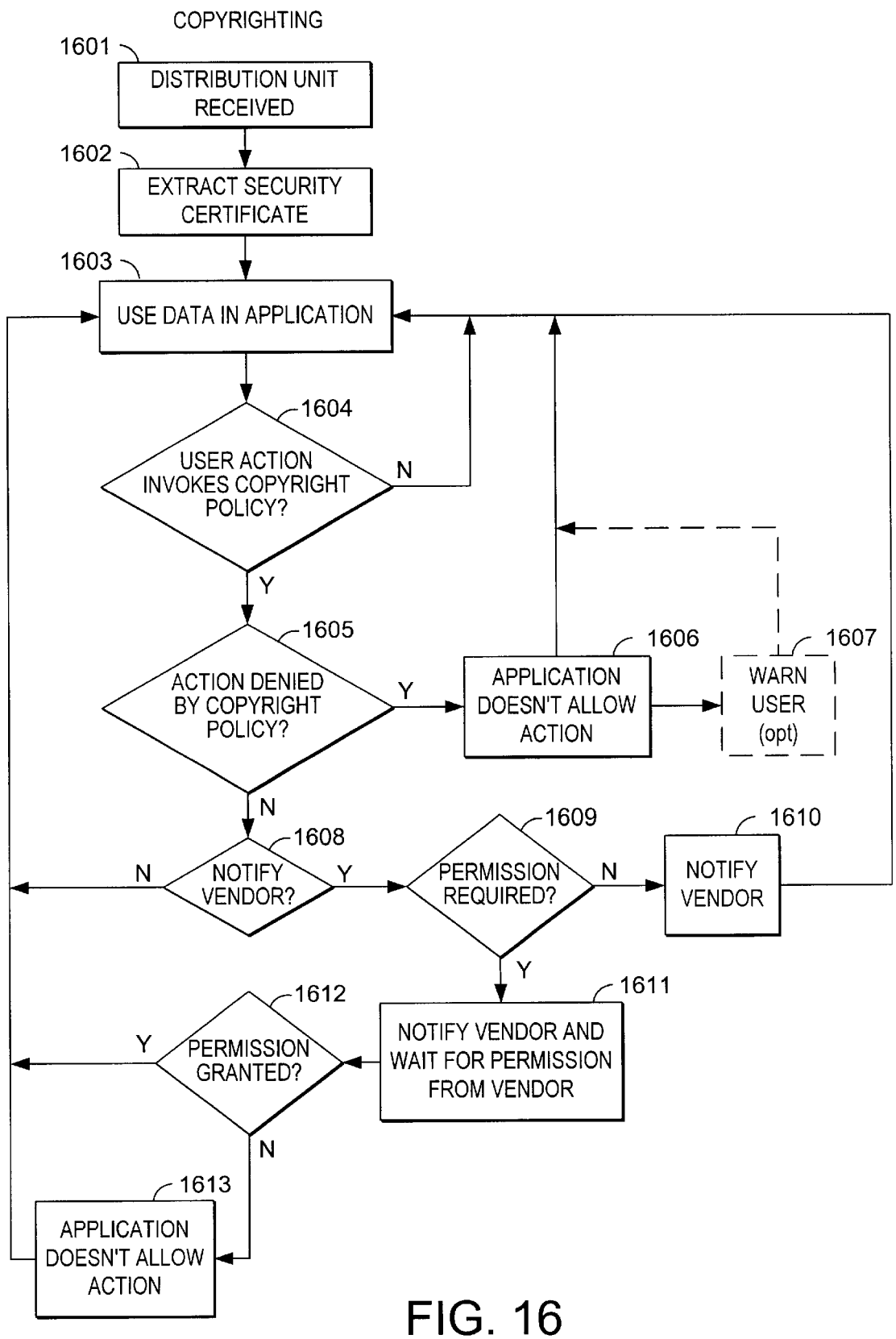
FIGS. 16, 17, 18 and 19 are flowcharts of methods to be performed by an acquiring client according to an exemplary alternate embodiments of the invention.
Figure 17:
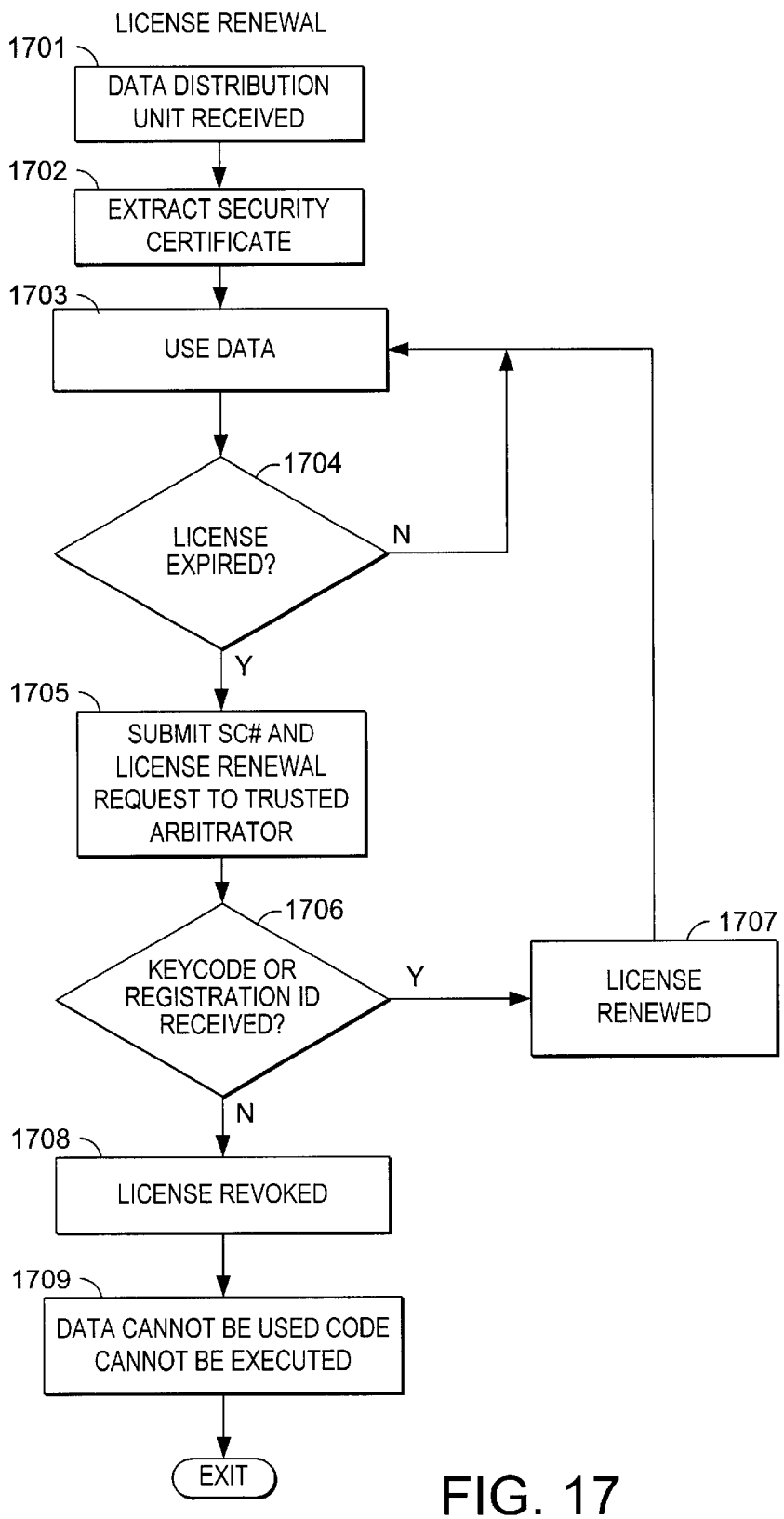

As shown in FIG. 16, if the security certificate specifies the copyright service, the user client computer monitors the user's actions on the data (step 1603). If the user's actions invoke the copyright policy (step 1604), the user client computer checks to determine if the action is in accordance with the copyright policy (step 1605). If the action is denied by the copyright policy, the user's action is disallowed (step 1606) and optionally the user is notified as to the reason (step 1607). If the user's action requires that the vendor be notified (step 1608) or that permission be requested from the vendor (step 1609), the vendor is notified (step 1610 or 1611). If the copyright policy specifies that the vendor must give permission for the action (step 1609), the client cannot save the results of their action until the user client computer receives permission from the vendor (step 1611). If permission is granted (step 1612), the user can continue with their action. If permission is denied, the user client computer notifies the user and the user's action is not allowed (step 1613).

When the user client computer receives a distribution unit containing security certificate that specifies the license service (refer to FIG. 17), the user client computer allows the user to use the data (step 1703) while the user has a valid license (step 1704). If the license has expired, the user client computer submits a request for a license renewal containing the security certificate serial number to the trusted arbitrator (step 1705). If a keycode or registration ID is received from the trusted arbitrator (step 1706), the license is renewed (step 1707) and the user can use the data. If the license was revoked (step 1708), the user client computer prevents the user from using the data (step 1709).

Figure 18:
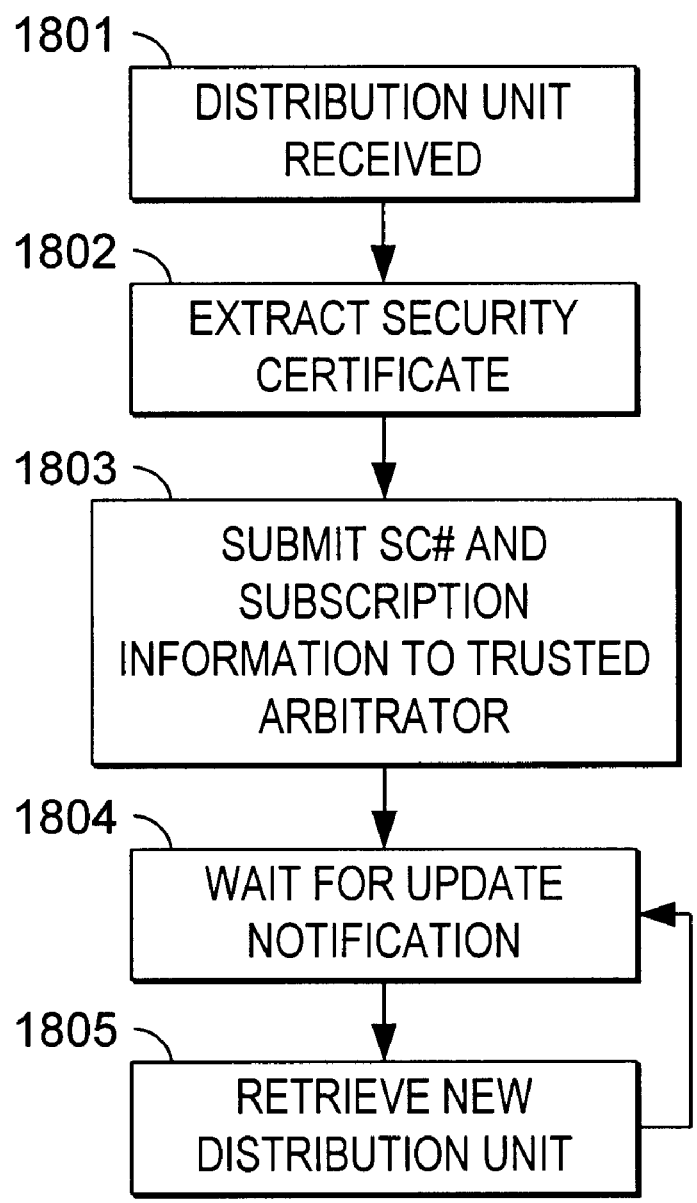
Figure 19:
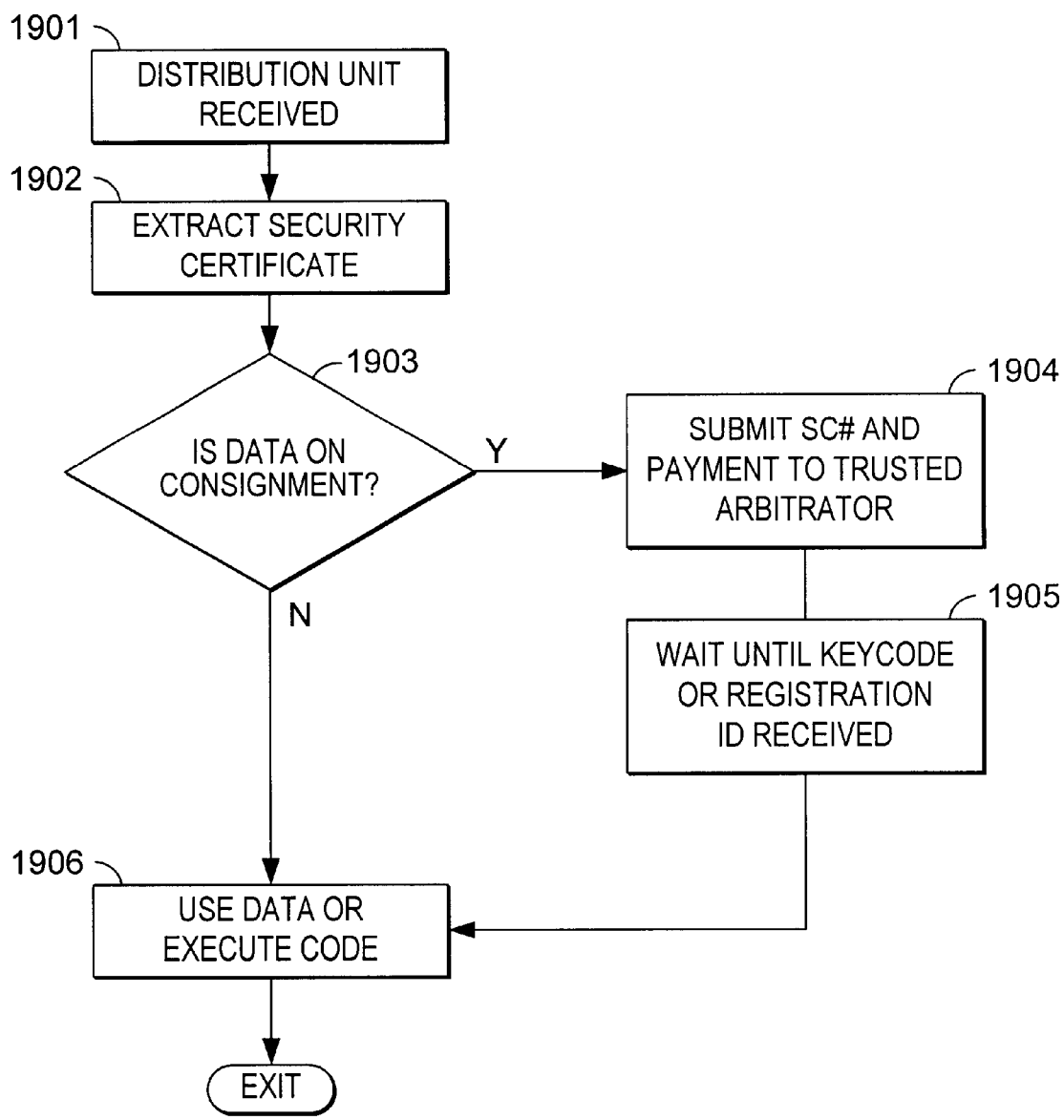

Referring now to FIG. 18, when the user client computer receives a distribution unit containing a security certificate specifying the subscription service, the user client computer submits a user subscription request containing the security certificate serial number and subscriber information (step 1803) to the trusted arbitrator. When the vendor updates the data and notifies the trusted arbitrator, the trusted arbitrator notifies all subscribers to the data (step 1804) and the subscribers retrieve the new distribution unit (step 1805).

A security certificate that specifies the consignment service (step 1903 in FIG. 19) causes the user client computer to submit a payment request containing the security certificate serial number and payment information (step 1904) to the trusted arbitrator. The user client computer does not allow the data to be used until the trusted arbitrator withdraws the payment from the user's account and returns a keycode or registration ID (step 1905). The user client computer allows the user to use the data (step 1906).

Examples of the security types and policy levels of certificates contemplated for use in the present invention are discussed in detail at this point. The context in which the information will be used determines what security services and policy enforcement are applicable. As will be readily apparent to one of skill in the art, the following examples are not exhaustive and other types and levels of security certificates can be used with the methods described herein without exceeding the scope of the invention. A security certificate can be created with a single type and level of security, or different types and varying levels of security can be combined into a single security certificate, i.e., combining copyrighting with licensing. Furthermore, a trusted arbitrator of the present invention can offer all or only a subset of the following security certificates without departing from the concepts envisioned by the inventor.

An exemplary format of a security certificate is shown immediately below with a brief description of the major sections following. The remaining section of the security certificate are self-explanatory. Note that multiple or future services with different policy levels can be combined in the security certificate without modifying the original format.

Security Certificate Format
Header block
   Set bytes confirming that this is a security certificate
   Length of Security Certificate
   Security Certificate Version
   Security Certificate Identifier unique for this certificate
   Time and Date of Registration
   Number of service blocks (zero or more)
Application Information Service block
   Set bytes confirming that this is an Application Information Service block
   Length of Application Information Service block
   Version of Application Information Service block
   Number of Applications (One or more)
   Application information
      Name of Application
      Version of Application
      Number of URLs to find Application
      URL to application
      Number of Services provided by Application
      Services
         Editing/Printing/Displaying/etc
Author Information Service block
   Set bytes confirming that this is an Author Information Service block
   Length of Author Information Service block
   Version of Author Information Service block
   Number of Authors of Data (Zero or more)
   Author information
      Name of Author
         Real Author name
            Author's Unique ID
         Anonymous
            No ID given
         Registered (Known to Authenticating Agency)
            Unique ID which maps to Author's Unique ID
         Pseudonym (Known to Authenticating Agency)
            Unique Pseudonym which maps to Author's Unique ID
      Contact Information
         Name
         Organization or Company
         Address of contact
         Email address
         URL
         Phone
      Number of Author Authentication Agencies (zero or more)
      Author Authentication Agency
         Name of Authenticating Agency
         Address
         Email
         URL
Distributor Information Service block
   Set bytes confirming that this is a Distributor Information Service block
   Length of Distributor Information Service block
   Version of Distributor Information Service block
   Number of Distributors (zero or more)
   Distributor information
      Name
      Organization
      Site URL
      Email address
      Type of distribution provided Download
Subscription
Consignment
    Bank routing information
    Type of payment accepted
Authentication Service block
  Version of Data Authentication Service
  Number of Data Authenticating Agencies (one or more)
  Data Authenticating Agency
    Name of Authenticating Agency
    Address
    Email
    URL
    (optional) Signature of digest by Authenticating Agency
Validation Service block
  Version of Validation Service
  Name of file validated
  Number of signatures of Authenticating Agency (one or more)
  Signature
    Name and version of algorithm used
    (optional) Signed security receipt by Authenticating Agency
Copyright Service block
  Version of Copyright Service
  Number of policies (zero or more)
  Copyright Policies (policies can be separate or combined):
    Viewing policy
      Must include copyright in view
      Can view freely
      Can view with author notification
      Can view with author permission
      Cannot view
    Displaying policy
      Must include copyright in display
      Can display freely
      Can display with author notification
      Can display with author permission
      Cannot display
    Copying policy
      Whole File and/or Parts (Cut&Paste)
      Must include copyright with new copy
      Can copy freely
      Can copy with author notification
      Can copy with author permission
      Cannot copy
    Distribution policy
      Must include copyright in distribution
      Can distribute freely
      Can distribute with author notification
      Can distribute with author permission
      Cannot distribute
    Modifying policy
      Must quote source when modified
      Can modify freely
      Can modify with author notification
      Can modify with author permission
      Cannot modify
    Storing policy
      Can store freely
      Can store with author notification
      Can store with author permission
      Cannot store
    Caching policy
      Can cache freely
      Can cache with author notification
      Can cache with author permission
      Cannot cache
Licensing Service block
  Version of Licensing Service
  Type of license
    Renewable
    Revocable
    Irrevocable
  Number of Licensors (zero or more)
  Licensor Information
    Name
    Organization or Company
    Address of contact
    Email address
    URL
    Phone
  Number of policies (zero or more)
  Licensing policies
    Ownership policy
      User must pay before usage
      User can use until license expires
      License revoked at end of subscription
    Number of uses policy
      Use one or more times
      Unlimited usage
    Number of users and/or machines policy
      One or more concurrent [user/machine]
      No concurrent [users/machines]
    Length of time of use policy
      Use only while subscribed to service
    Use for set duration when running
      Use for set duration since installation
      Usage ends on Time and Date
      Unlimited
    Credentials policy
      No credentials required
      Adult material (user must be registered as adult)
      Groups (user must be registered with set groups)
        Number of groups
        One or more Group credentials
          Group which has access
          Group Authenticating Agency
      Domains (computer address is in set domains)
        Number of domains
        One or more domains which have access
          Network mask for domain
      Passwords
        Number of passwords (one or more)
        Passwords which will unlock data
Subscription Service block
  Version of Subscription Service
  Edition of this data
  Number of policies (zero or more)
  Subscription policies
    Level policy
      All subscribers can access
      Subscribers at certain level can access
    Update policy
      Update when original data changed
      Update periodically
        Period to update
      Update on payment Update on demand
Consignment Service block
  Version of Consignment Service
  Number of policies (zero or more)
  Consignment policies
    Cost policy
      Free
      Amount per license
Data Encryption Service block
  Version of Encryption Service
  Encryption Algorithm used
  Version of Encryption Algorithm
  Algorithmic Information
    Users which can unlock data
    Public keys which will unlock data (zero or more)
    Public keys
    etc.
Data Watermark Service block
  Version of Watermark Service
  Watermark Algorithm used
  Version of Watermark Algorithm
  Watermark Information
Data Compression Service block
  Version of Compression Service
  Compression Algorithm used
  Version of Compression Algorithm
  Compression Information
    Huffman Data block
    Quantization levels
    etc.
Installation Service block
  Version of Installation Service
  Number of units to install (one or more)
  Unit
    Version of unit
    Number of data files in unit (one or more)
    Data file
      Data file name
      Data file size
      Flags
      Location after installation
  Authentication Section The trusted arbitrator authenticates the requestor's credentials and returns a security certificate containing the information about the trusted arbitrator in the Authentication Service section. An Authentication certificate allows receivers of the data to authenticate and validate the vendor as the original author of the data.

Validation Section

When a trusted arbitrator provides a security certificate containing the Validation Service section to a request or, the trusted arbitrator guarantees to validate any digests sent to it against the digest originally sent by the requestor. Validation does not prevent others from registering someone else's original work, but as long as the originator registers a digest with the trusted arbitrator before the work is publicly released, the entry for the originator's digest will be earlier than all others.

The trusted arbitrator can also digitally sign the digest and include the signature in the Validation Service section. If receivers of the data can validate that the signature is correct, they can validate the data without submitting the digest to the trusted arbitrator.

Copyrighting Section

The Copyright Service is available with different levels of policy enforcement. The following are examples of levels of policy that can be enforced:

copy freely without author consent,
  modify freely without author consent,
  distribute freely without author consent,
  notify author before copy,
  notify author before modification,
  notify author before distribution,
  no copying,
  no modification,
  no distribution,
  cannot cut and paste parts of the data, but can copy all data intact,
  must include copyright policy when viewing,
  cannot display (in the case of web pages), and
  no caching (in the case of web browsers, routers, and servers).

The level(s) of the copyright certificate requested is dependent on the data and the policy enforcement desired by the author, i.e., a movie can be copyrighted to allow the viewer to watch it, but not store it digitally, while digital data can be viewed, displayed, but not cached. Different portions of a single work can have different copyright policies so that the author of a song can copyright the melody and lyrics separately, for example.

There is also the ability to allow anonymous copyrighting where the user is notified that the original author has requested a copyright policy, but the security certificate does not reveal the identify of the author to the user.

Licensing Section

Licensing policy enforcement can be set for executable code or other electronic information through the License Service section of a security certificate. As with copyrighting, licensing certificates are available in varying levels with the following provided as examples:

X number of uses,
  X number of users,
  expiration date,
  user must pay before use,
  user can use only while subscribing to service,
  only users within particular computer domains or user groups can use data,
  data must be unlocked by keycode or password before use,
  revocable, and
  irrevocable.

The levels of licensing policy can be combined with other policies such as the copyright policies. Thus, for example, an author can restrict the user to a certain number of uses and also restrict the number of times the user can redistribute the information. The keycode or password would be particular to the user so that it unlocks the information one computer but cannot be used to unlock the information on another computer. The other computer would have to request a new license for the information by sending a new license request to the trusted arbitrator with the security certificate serial number.

Subscription Section

The author of a work, such as a software application, that wishes to provide updates to registered users (subscribers) of the work requests a Subscription certificate from the trusted arbitrator. A user is registered as a subscriber when it sends the digest containing the subscription certificate on the trusted arbitrator. The subscriber's name and address, along with the information subscribed to, are stored by the trusted arbitrator. Subscription certificates come in varying levels related to certain events, for example:

information changes (when the author updates the file),
payment updates (when the subscriber pays),
a time period passes (daily, weekly, monthly, etc), and
on-demand (when the subscriber requests it).

The levels of subscription can be combined with licensing so that the author requires the subscriber to pay for the information. The type of payment can be specified, i.e., pay after a trial period, pay on installment, or pay per each piece of information received.

The trusted arbitrator can notify the subscriber of the updates via e-mail, by "push" to the user's desktop using technology such as Microsoft's Active Channels which allows a user to subscribe to an automatic notification service, or by pointing the user to an Internet URL (uniform resource locator) where the user can view/download the new information. The trusted arbitrator can also offer an anonymous subscription certificate where the subscriber is notified when the author updates the information, but the subscriber's data is held in confidence by the trusted arbitrator and not revealed to the author.

Consignment Section

A consignment certificate causes the trusted arbitrator to enforce a payment policy on the user of the electronic information. Consignment certificates apply various levels of policy enforcement, for example:

alert the user periodically (as in so-called "nagware"),
force the user to pay before running,
force the user to pay after a license has expired,
unlock features after the user paid, and
e-mail the user with requests to pay.

Summary

The particular methods performed by the server computer for a trusted arbitrator of an exemplary embodiment of the invention have been described. The method performed by the server has been shown by reference to flowcharts in FIGS. 7, 8, 9, 10, 11, 12A, 12B and 13, including the steps from 701 through 707, 801 through 816, 901 through 906, 1001 through 1012, 1101 through 1113, 1201 through 1224, and 1301 through 1310.

The particular methods performed by the client computer for a software vendor of an exemplary embodiment of the invention have been described. The method performed by the vendor client computer has been shown by reference to flowcharts in FIG. 14, including the steps from 1401 through 1408.

The particular methods performed by the client computer for a user of an exemplary embodiment of the invention have been described. The method performed by the user client computer has been shown by reference to flowcharts in FIGS. 15, 16, 17, 18 and 19, including the steps from 1500 through 1512, 1601 through 1613, 1601 through 1709, 1801 through 1805, and 1901 through 1906.

Additionally, exemplary embodiments of security certificates for use with the methods have been described. The combination of the security certificates and methods provide an easy mechanism to protect originators of electronic data from misuse while, at the same time, protecting users from corrupted data.

Internet Implementation

Figure 20:
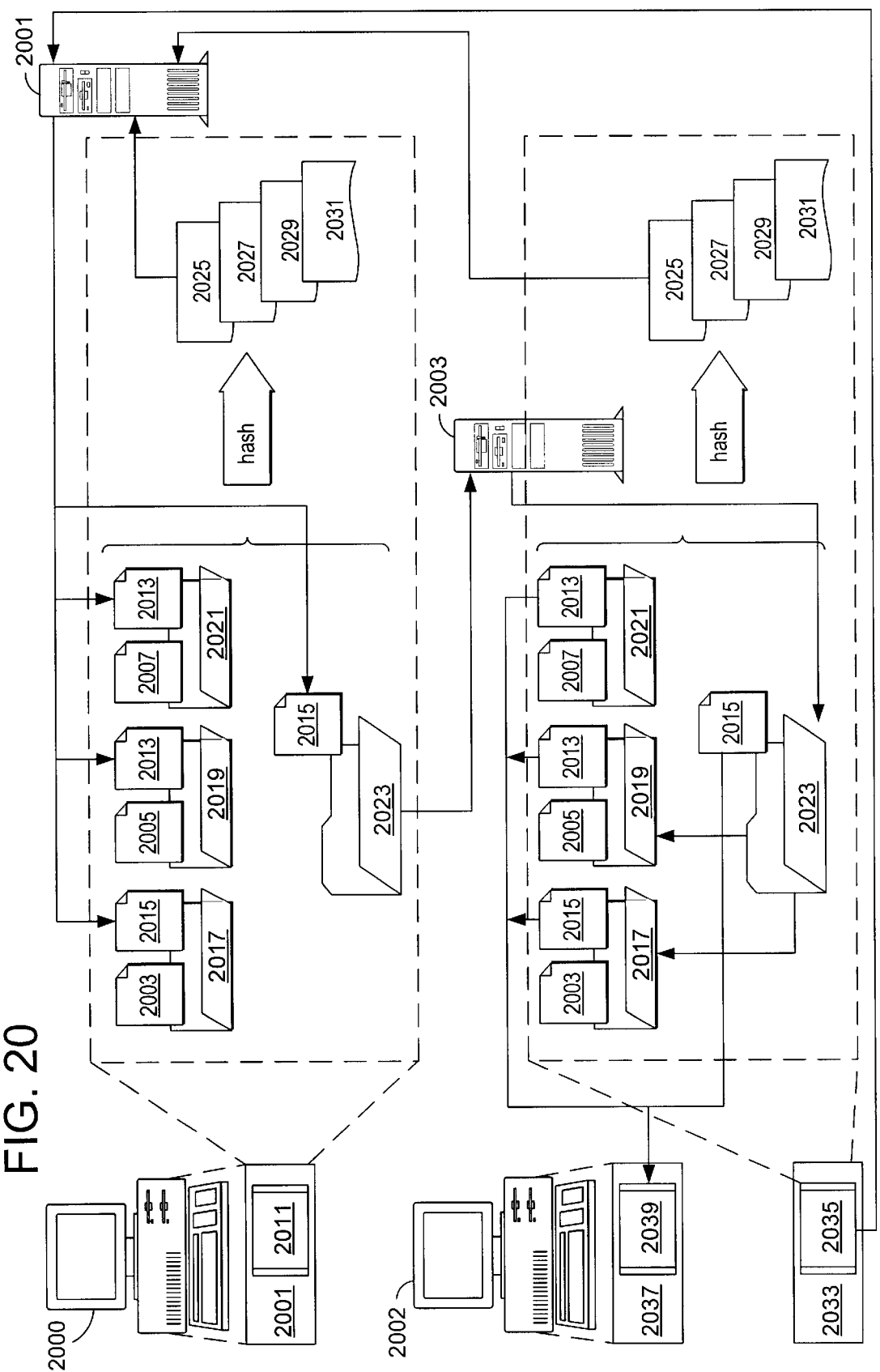
FIG. 20 is a block diagram of an exemplary embodiment of computer program modules that cause computers to execute the methods shown.

In this section of the detailed description, a particular implementation of the invention is described that provides the security services and policy enforcement through standard software applications executing on the client computers when the electronic data is distributed through the Internet. FIG. 20 illustrate modules, or components, included in the standard software applications that cause the client computers to automatically execute the methods described in the previous section. The components necessary to implement the methods for the server computer are incorporated into standard software used by a certificate authority or similar trusted third party and are described after the components for the clients. As one skilled in the art will readily recognize, the components can be written in any executable language and can be routines, callable library functions, or objects in an object-oriented environment such as Java.

An object is an encapsulated collection of code and data having internal functions (methods) that operate on the data and expose external interfaces (properties) used to communicate with the object. Objects which can implement this invention include, but are not limited to, ActiveX controls which supply a standard set of functions in an interface. The ActiveX control would recognize the security certificate format and implement its security services and policies. Application (web browsers, word processors, paint programs, etc.), could load the ActiveX control and call functions to determine the correct policy to implement. The user would not be hindered by the ActiveX control and would intervene only when necessary.

In this example, assume a publicity agent for a singer uses client computer 2000 to create an electronic press release kit to announce the singer's new album. The agent wants to include a press release document 2003, a clips from the music video for the album 2005, and a text file containing lyrics for the songs of the album 2007. While the agent wants users to freely redistribute the entire electronic press release kit and the press release document to gain the most exposure for the singer, the agent also needs to protect the video and lyric information.

The agent uses a World Wide Web browser 2009, such as Microsoft Internet Explorer, to connect to a web page on a trusted arbitrator's server 2001. The agent fills out a form on the web page to request security certificates for data files 2003, 2005, 2007 and for a distribution unit 2023 that will contain all of the data files 2003, 2005, 2007. A security component 2011 in the browser 2009 automatically provides to the server the credential information required to authenticate the agent.

The security component 2011 computes the digests 2025, 2027, 2029 and 2031 of the requested files and their combination, respectively, using a one-way hashing function. The request for the security certificate for the press release 2003 contains the digest 2025 and the copyright service specifying the "copy freely" policy. Since the agent wants to protect the video clips from being bootlegged, the request for the security certificate for data file 2005 contains the digest 2027 and the copyright service specifying the "view only" policy. The lyrics can be copied in whole or in part, but only if they are attributed to the original song writers. The security certificate request for the lyric file 2007 contains the digest 2029 and the copyright service specifying the "can copy whole file and/or parts, but must include copyright" policy. The agent also requests a security certificate for the distribution unit 2023 which contains the "copy freely" policy and submits the digest of all the files 2003, 2005, 2007 in the request.

The trusted arbitrator returns the security certificates 2013, 2014 and 2015 for the files 2003, 2005 and 2007, respectively, and returns 2016 for the distribution unit 2023. The agent packages each security certificate with its data and creates a nested distribution unit 2023 which serves as the press release kit. The agent requests that the browser 2009 upload the press release kit 2023 to several web sites that specialize in music entertainment 2040.

A user browsing one of the music entertainment sites 2040 sees an announcement regarding the press release kit. When the user clicks on a link to the press release kit, the distribution unit 2023 is downloaded to the client (user's) computer 2002. A security component 2035 in the user's browser 2033 extracts the security certificates 2013, 2014, 2015 of all the files 2003, 2005, 2007 in the distribution unit 2023 and the security certificate2016 of the distribution unit 2023. The security component 2035 computes digests 2025, 2027, 2029, 2031 from the data files 2003, 2005, 2007 and the distribution unit 2023, connects to the trusted arbitrator's server 2001, and submits a validate request to the trusted arbitrator's server 2001. The validate request contains the serial numbers of the security certificates 2013, 2014, 2015, 2016 and the digests 2025, 2027, 2029, 2031.

Once the validation is complete, the security component 2035 in the browser 2033 allows the user to view the data. The browser 2033 now displays the press release document 2003 and lyrics 2007 to the user and can play the music video 2005. However, if the user attempts to save the lyrics 2007 in whole or in part to a different location on the computer 2002, the security component 2035 in the browser 2033 copies the original copyright notice attributing the lyrics to the original author. If the user attempts to modify or copy the music video to a different location, the security component 2035 in the browser 2033 notifies the user that the music video is view only and cannot be copied or modified.notifies.

When the user exits the browser 2033, the user can access the press release document 2003, the video clip 2005, and the lyric file 2007 through their "native" applications 2037, such as Microsoft Word and Microsoft Media Player. When the user requests that the native application 2037 open one of the items 2003, 2005, 2007 in the press release kit, a security component 2039 in the native application 2037 uses the associated security certificate 2013, 2014, 2015 to determine the proper uses of the item. If the user requests the native application 2037 copy or modify the item, the security component 2039 in the native application 2037 notifies the user of the improper use and aborts the operation. In the embodiment illustrated in FIG. 20, the security components 2035 and 2039 are shown as separate modules. Alternate embodiments in which the same security module is shared among all software executing on the user's computer which need to validate data are considered within the scope of the invention.

The server 2001 for the trusted arbitrator executes standard server software containing three components that provide the services required by the client computer. Because the components are considered to be well within the understanding of one of skill in the art based on the details provided in the previous section, the components are not illustrated in FIG. 20.

A server security module creates the security certificates 2013, 2014, 2015, 2016 when the server 2001 receives the request from the client computer 2000 and returns the security certificates to the client computer 2000. A registration module logs the digests 2025, 2027, 2029, 2031 received from the client computer 2000 into the verification log and returns the time stamped receipts to the client computer. A server security module compares the digest received from the client computer 2002 with the logged digest and returns validation messages when the digests match.

This section has described a particular implementation of the security services and policy enforcement for electronic data provided by components within standard software applications running on a client computer. The components can be provided as add-on modules, such as applets downloaded for use in a browser, or can be incorporated in the software as a standard feature. This section has also described a particular implementation of the security services and policy enforcement for electronic data provided by components within standard server software.

Conclusion

A series of transactions and security certificates have been described which authenticate and validate electronic data and also enforce restrictions on the use of that data. The transaction functions are performed by components within standard software applications based on the security type and policy level of a security certificate included with the data.

Thus, the present invention guarantees the authenticity and validity of the electronic data and enforce use restrictions on the data through the use of the certificates. Furthermore, the verification log serves to memorialize the author and creation time of the data since the server has authenticated an author prior to creating the certificate and time stamps the certificate and the digest that is generated from the electronic data. Because the client functions are automatically provided by modules, or components, in standard software, the author and the user do not have to concern themselves with complicated encryption/decryption schemes. The server functions are additional components to server software that already provides electronic certificates.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application with respect to is meant to include all hardware and software platforms. Therefore, it is manifestly intended that this invention be limited only by the following claims and equivalents thereof.

I claim:

1. A computerized method for providing security services and policy enforcement for electronic data, the method comprising the steps of:

submitting, by a first client, a certificate request to a server;

receiving, by the server, the certificate request, authenticating the first client, generating a certificate, registering the certificate, and transmitting the certificate to the first client;

receiving, by the first client, the certificate, creating an authenticated file containing the certificate and a distribution unit, generating a first digest from the authenticated file using a hashing algorithm, and submitting the first digest to the server;

time stamping, by the server, the digest, logging the digest, and transmitting a time stamped receipt to the first client;

acquiring, by a second client, the authenticated file, generating a second digest from the authenticated file using the hashing algorithm, and submitting the second digest to the server; and receiving, by the server, the second digest, comparing the second digest to the logged first digest, and transmitting a message to the second client as a result of the comparison.

2. The computerized method of claim 1, wherein the certificate requested is a security certificate.

3. The computerized method of claim 1, wherein the certificate requested is a subscription certificate and further comprising the steps of:

registering, by the server, the second client as having the authenticated file;

creating, by the first client, an update authenticated file containing the certificate and an updated version of the distribution unit, generating an update digest from the update authenticated file using the hashing algorithm, and submitting the update digest to the server;

receiving, by the server, time stamping and logging the update digest, and returning a time stamped update receipt to the first client; and determining, by the server, that the second client has the authenticated file and notifying the second client of the update authenticated file.

4. The computerized method of claim 1, wherein the certificate requested is a policy enforcement certificate.

5. The computerized method of claim 4, further comprising the steps of:

generating, by the second client, a notification that the data in the distribution unit is being used inappropriately based on a policy level specified in the certificate receiving, by the server, the inappropriate use notification; and notifying the first client of the inappropriate use.

6. The computerized method of claim 4, wherein the message returned by the server to the second client requests the second client pay for the authenticated file and further comprising the steps of:

receiving, by the server, a payment from the second client; and transmitting, by the server, a key to unlock data in the distribution unit.

7. A computer-readable medium having computer-executable instructions to a cause a server computer to perform a method comprising:

creating a certificate in response to receiving a certificate request from an authenticated first client;

registering the certificate as held by the first client;

transmitting the certificate to the first client;

logging a digest received from the first client using a first time stamp;

comparing a digest received from a second client with the logged digest; and transmitting a comparison result message to the second client.

8. The computer-readable medium of claim 7, further comprising the steps of:

receiving a notification that the second client is using data associated with the logged digest inappropriately based on a policy level specified in the certificate; and transmitting a notification of inappropriate use to the first client.

9. The computer-readable medium of claim 7, further comprising the steps of:

registering the second client as having data associated with the logged digest;

logging an update digest received from the first client using a second time stamp;

returning an update receipt to the first client; and notifying the second client of that the data associated with the logged digest has been updated.

10. The computer-readable medium of claim 7, further comprising the steps of:

transmitting a request for payment to the second client;

receiving payment from the second client; and transmitting a key to unlock data associated with the logged digest.

11. A computer-readable medium having computer-executable instructions to a cause a client computer to perform a method comprising:

transmitting a certificate request to a server;

receiving a certificate from the server;

generating a digest from the certificate combined with a distribution unit using a hashing algorithm;

transmitting the digest to the server; and receiving a time stamped confirmation message for the digest from the server.

12. The computer-readable medium 11, wherein the method further comprises receiving an inappropriate use message from the server.

13. The computer-readable medium of claim 11, wherein the method further comprises:

generating an update digest from the certificate and an updated version of the distribution unit;

transmitting the update digest to the server; and receiving a time stamped confirmation message for the update digest from the server.

14. A computer-readable medium having computer-executable instructions to a cause a client computer to perform a method comprising:

generating a digest from a certificate and a distribution unit received by the client;

transmitting the digest to a server;

receiving a message from the server as a result of transmitting the digest;

determining that data in the distribution unit is being used inappropriately based on a policy level specified in the certificate;

alerting a user of the client computer of the inappropriate use; and transmitting a notification message to the server regarding the inappropriate use if the user continues the use.

15. The computer-readable medium of claim 14, wherein the method further comprises receiving an update notification from the server that data in the distribution unit has been updated.

16. The computer-readable medium of claim 14, wherein the method further comprises:

receiving a payment request from the server;

transmitting a payment to the server; and receiving a key from the server to unlock data in the distribution unit.

17. A computer system comprising:
a processing unit;
a system memory coupled to the processing unit through a system bus;
a computer-readable medium coupled to the processing unit through a system bus; and
a client application executed from the computer-readable medium by the processing unit, wherein the client application comprises:
 a validation module that causes the processing unit to generate a digest from an authenticated file received by the processing unit, to submit the digest to a server, and to receive a message from the server as a result of submitting the digest;
 wherein the validation module further causes the processing unit to detect inappropriate use of data in the authenticated file based on a policy level specified in a certificate in the authenticated file, to notify a user of the computer of the inappropriate use, and to submit an inappropriate use message to the server if the use continues.

18. The computer system of claim 17, wherein the validation module further causes the processing unit to receive an update notification from the server.

19. The computer system of claim 17, wherein the validation module further causes the processing unit to receive a payment request from the server, to submit payment to the server in response to the payment request, and to receive a key to unlock data in the authenticated file.

20. The computer system of claim 17, wherein the client application further comprises:
 an authentication module that causes the processing unit to create a request for a certificate, to submit the request to a server, to combine a distribution unit and the certificate received from the server into an authenticated file, to generate a digest from the authenticated file using a hashing algorithm, to submit the digest to the server, and to receive a confirmation message from the server.

21. The computer system of claim 20, wherein the authentication module further causes the processing unit to combine an updated version of the distribution unit and the certificate into an update authenticated file, to generate a digest from the update authenticated file using the hashing algorithm, to submit the update digest to the server, and to receive an update confirmation message from the server.

22. The computer system of claim 20, wherein the authentication module further causes the processing unit to receive an inappropriate use notification message from the server.

23. A computer system comprising:
a processing unit;
a system memory coupled to the processing unit through a system bus;
a computer-readable medium coupled to the processing unit through a system bus; and
a client application executed from the computer-readable medium by the processing unit, wherein the client application comprises:
 an authentication module that causes the processing unit to create a request for a certificate, to submit the request to a server, to combine a distribution unit and the certificate received from the server into an authenticated file, to generate a digest from the authenticated file, to submit the digest to the server, and to receive a confirmation message from the server.

24. The computer system of claim 23, wherein the authentication module further causes the processing unit to combine an updated version of the distribution unit and the certificate into an update authenticated file, to generate an digest from the update authenticated file using the hashing algorithm, to submit the update digest to the server, and to receive an update confirmation message from the server.

25. The computer system of claim 23, wherein the authentication module further causes the processing unit to receive an inappropriate use notification message from the server.

26. A computer system comprising:
a processing unit;
a system memory coupled to the processing unit through a system bus;
a computer-readable medium coupled to the processing unit through a system bus; and
a client application executed from the computer-readable medium by the processing unit, wherein the client application comprises:
 a security module that causes the processing unit to detect inappropriate use of data in an authenticated file based on a policy level specified in a certificate in the authenticated file, to notify a user of the computer of the inappropriate use, and to submit an inappropriate use message to a server if the use continues.

27. A computer system comprising:
a processing unit;
a system memory coupled to the processing unit through a system bus;
a computer-readable medium coupled to the processing unit through a system bus; and
a server application executed from the computer-readable medium by the processing unit, wherein the server application comprises:
 a certificate module that causes the processing unit to create a certificate in response to receiving a certificate request from an authenticated requesting client, to register the certificate, and to transmit the certificate to the requesting client;
 a registration module that causes the processing unit to log a digest with a time stamp in response to receiving the digest, and to return a confirmation message; and
 a security module that causes the processing unit to compare a digest received by the processing unit against the logged digest, and to transmit a message as a result of the comparison.

28. The computer system of claim 27, wherein the security module causes the processing unit to receive, from a client, an inappropriate use message based on a policy level specified in the certificate and to notify the client that requested the certificate of the inappropriate use.

29. The computer system of claim 27, wherein the message transmitted by the security module as a result of the comparison is a payment request, and the security module further causes the processing unit to receive a payment and to transmit a key in response to receiving the payment.

* * * * *

UNITED STATES PATENT AND TRADEMARK OFFICE
CERTIFICATE OF CORRECTION

PATENT NO.   : 6,510,513 B1  Page 1 of 1
DATED        : January 21, 2003
INVENTOR(S)  : Danieli It is certified that error appears in the above-identified patent and that said Letters Patent is hereby corrected as shown below:

Column 21,
Line 55, replace "request or" with -- requestor --.

Signed and Sealed this

Eighth Day of April, 2003

JAMES E. ROGAN
*Director of the United States Patent and Trademark Office*